(12) United States Patent
Ho

(10) Patent No.: US 11,892,570 B2
(45) Date of Patent: Feb. 6, 2024

(54) OPTICAL ASSEMBLY THAT GENERATES DISTINCTIVE IRRADIANCE PATTERN OF LIGHT

(71) Applicant: Advanced Semiconductor Engineering, Inc., Kaohsiung (TW)

(72) Inventor: Hsin-Ying Ho, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 770 days.

(21) Appl. No.: 16/825,704

(22) Filed: Mar. 20, 2020

(65) Prior Publication Data
US 2021/0293940 A1    Sep. 23, 2021

(51) Int. Cl.
| | |
|---|---|
| *G01S 7/497* | (2006.01) |
| *G01S 7/481* | (2006.01) |
| *G01S 17/08* | (2006.01) |
| *G01S 17/04* | (2020.01) |
| *G01S 1/04* | (2006.01) |

(52) U.S. Cl.
CPC .............. *G01S 7/497* (2013.01); *G01S 1/04* (2013.01); *G01S 7/4814* (2013.01); *G01S 7/4816* (2013.01); *G01S 17/08* (2013.01)

(58) Field of Classification Search
CPC ...... G01S 7/497; G01S 7/4814; G01S 7/4816; G01S 17/08; G01S 17/04
See application file for complete search history.

(56) References Cited

U.S. PATENT DOCUMENTS

| | | | | |
|---|---|---|---|---|
| 5,898,183 | A * | 4/1999 | Teder | B60S 1/0822 |
| | | | | 250/341.8 |
| 6,665,427 | B1 * | 12/2003 | Keagy | G06V 40/1324 |
| | | | | 382/127 |
| 7,460,107 | B1 * | 12/2008 | Bohn | G06F 3/02 |
| | | | | 345/166 |
| 2016/0306072 | A1 * | 10/2016 | A Tharumalingam | |
| | | | | H01L 24/94 |
| 2020/0256990 | A1 * | 8/2020 | Uedaira | H03K 17/941 |

* cited by examiner

*Primary Examiner* — Jennifer D Bennett
(74) *Attorney, Agent, or Firm* — FOLEY & LARDNER LLP

(57) ABSTRACT

An optical assembly includes a light-emitting device, a partition structure and a cover. The partition structure defines a first space for accommodating the light-emitting device. The cover is disposed over the partition structure. The cover has a first surface facing the partition structure and a second surface opposite to the first surface. A light emitted by the light-emitting device forms a first irradiance pattern projected on the second surface of the cover, and the first irradiance pattern includes a first dark zone traversing the first irradiance pattern.

19 Claims, 17 Drawing Sheets

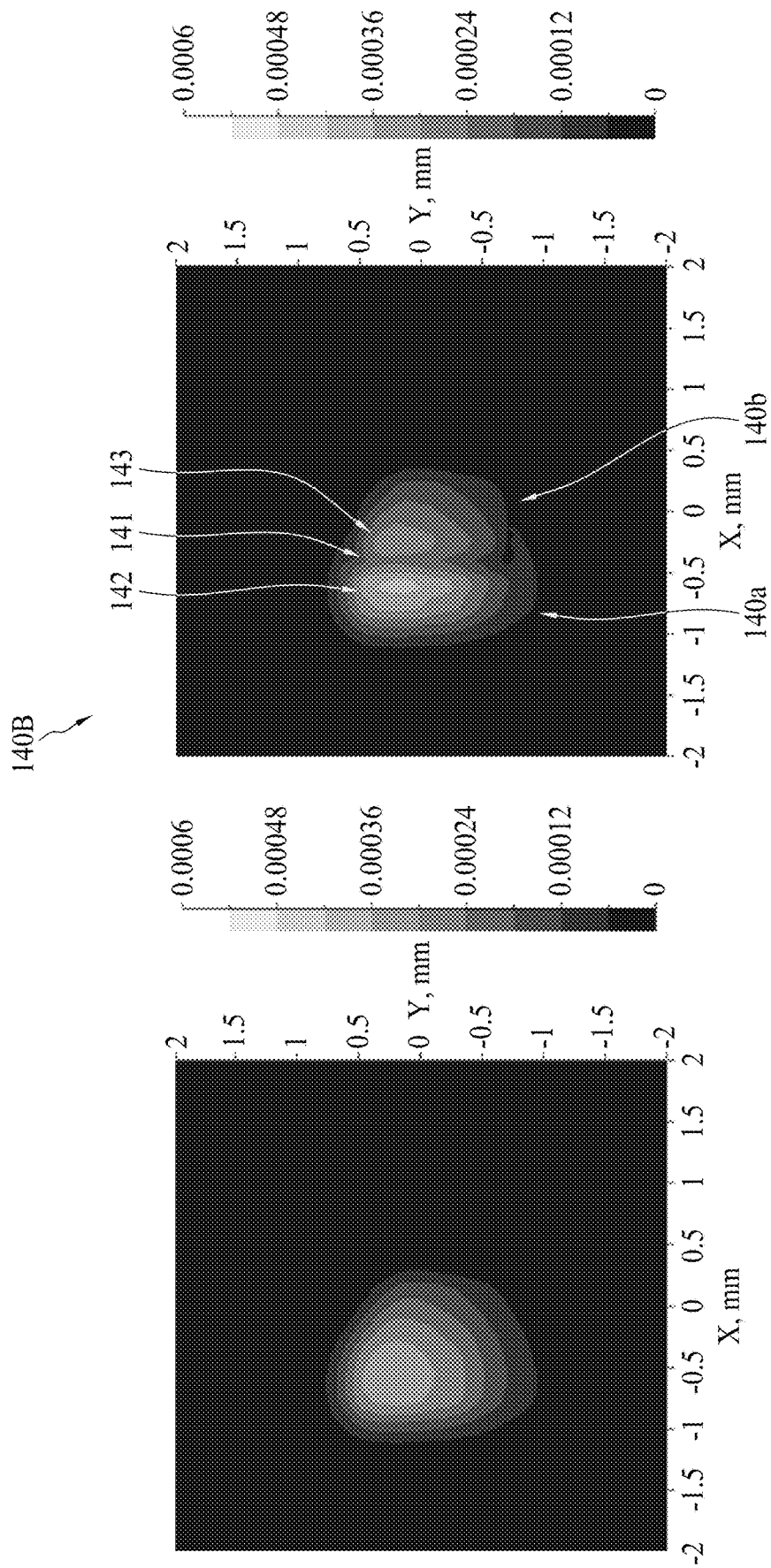

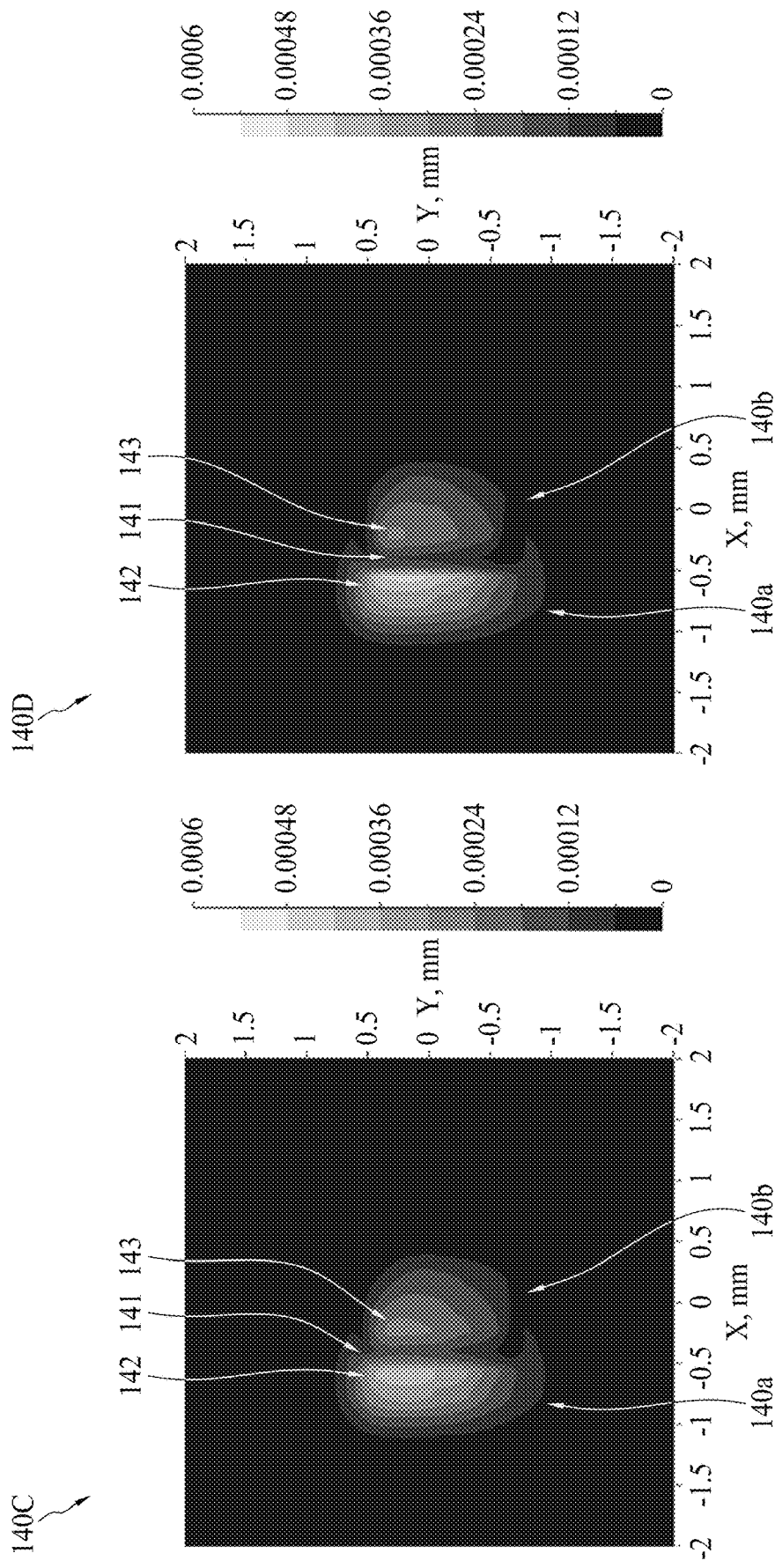

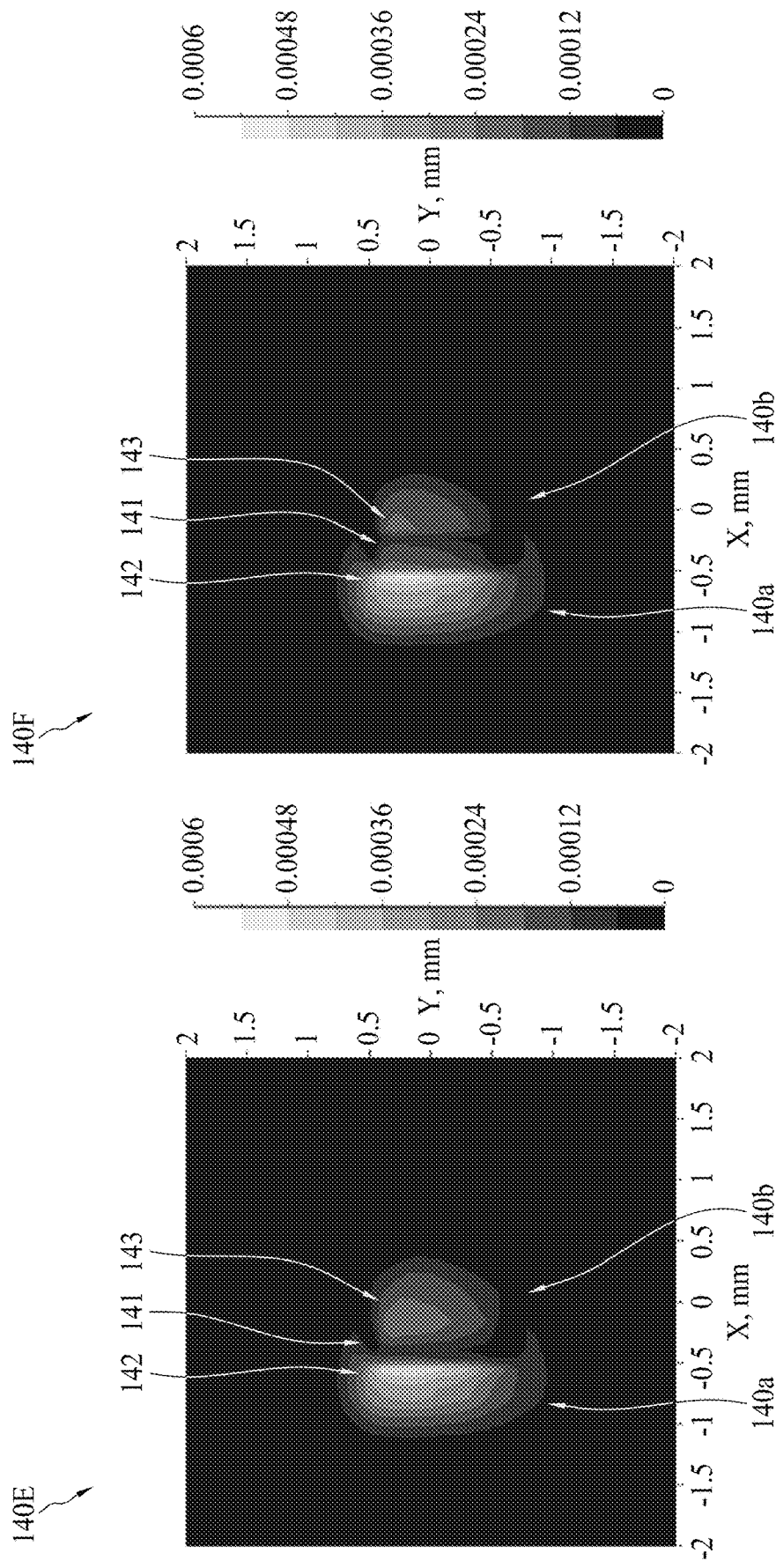

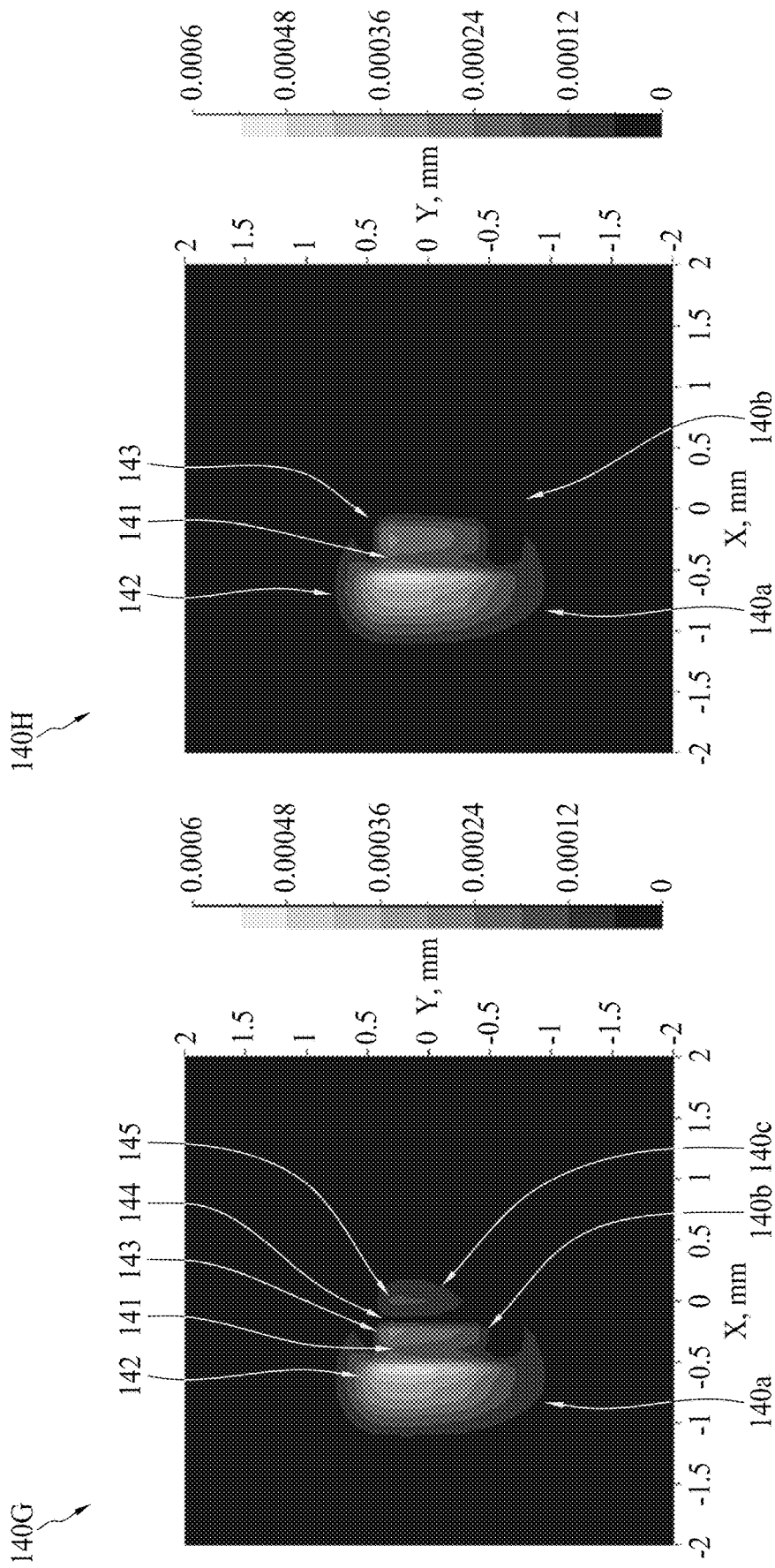

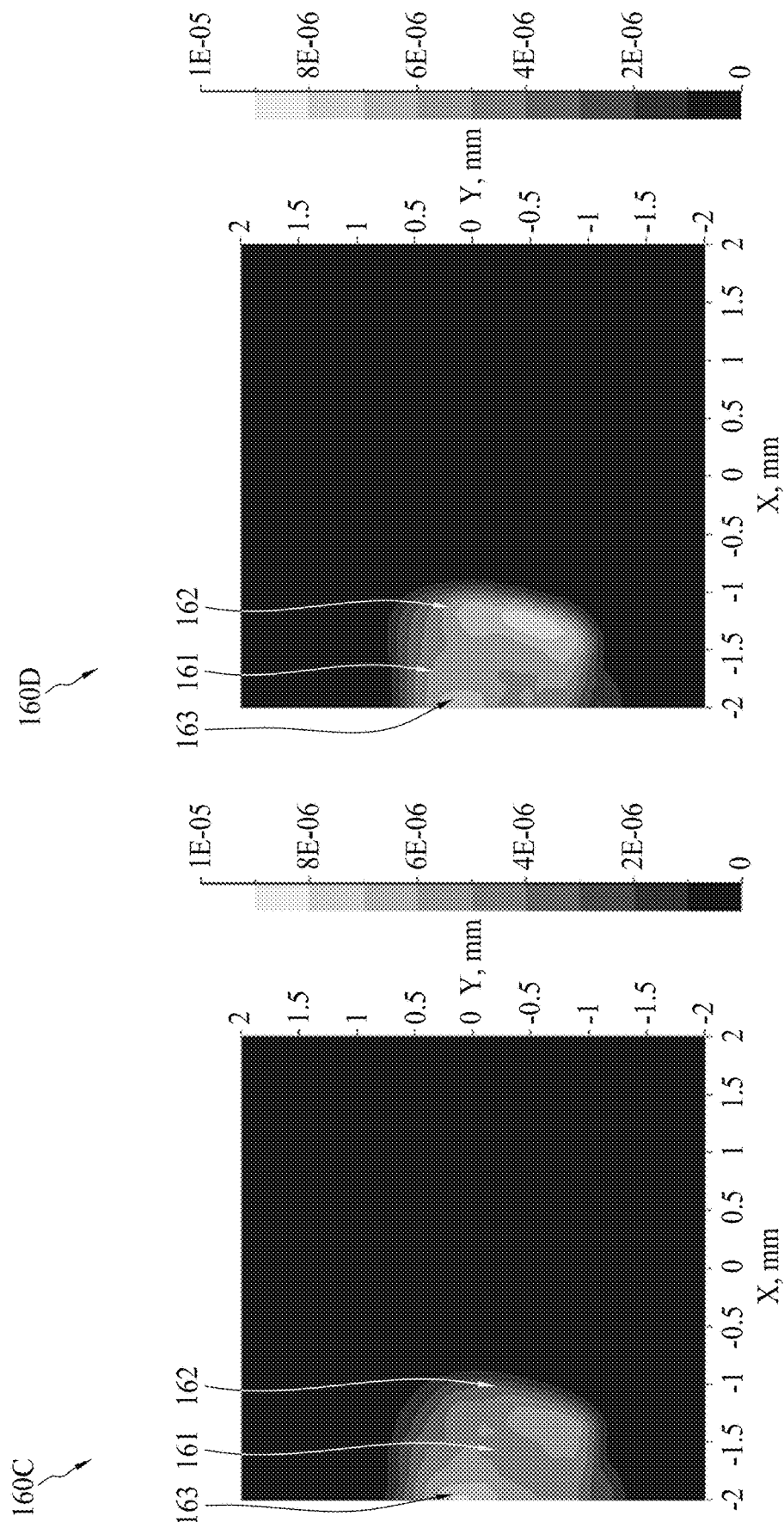

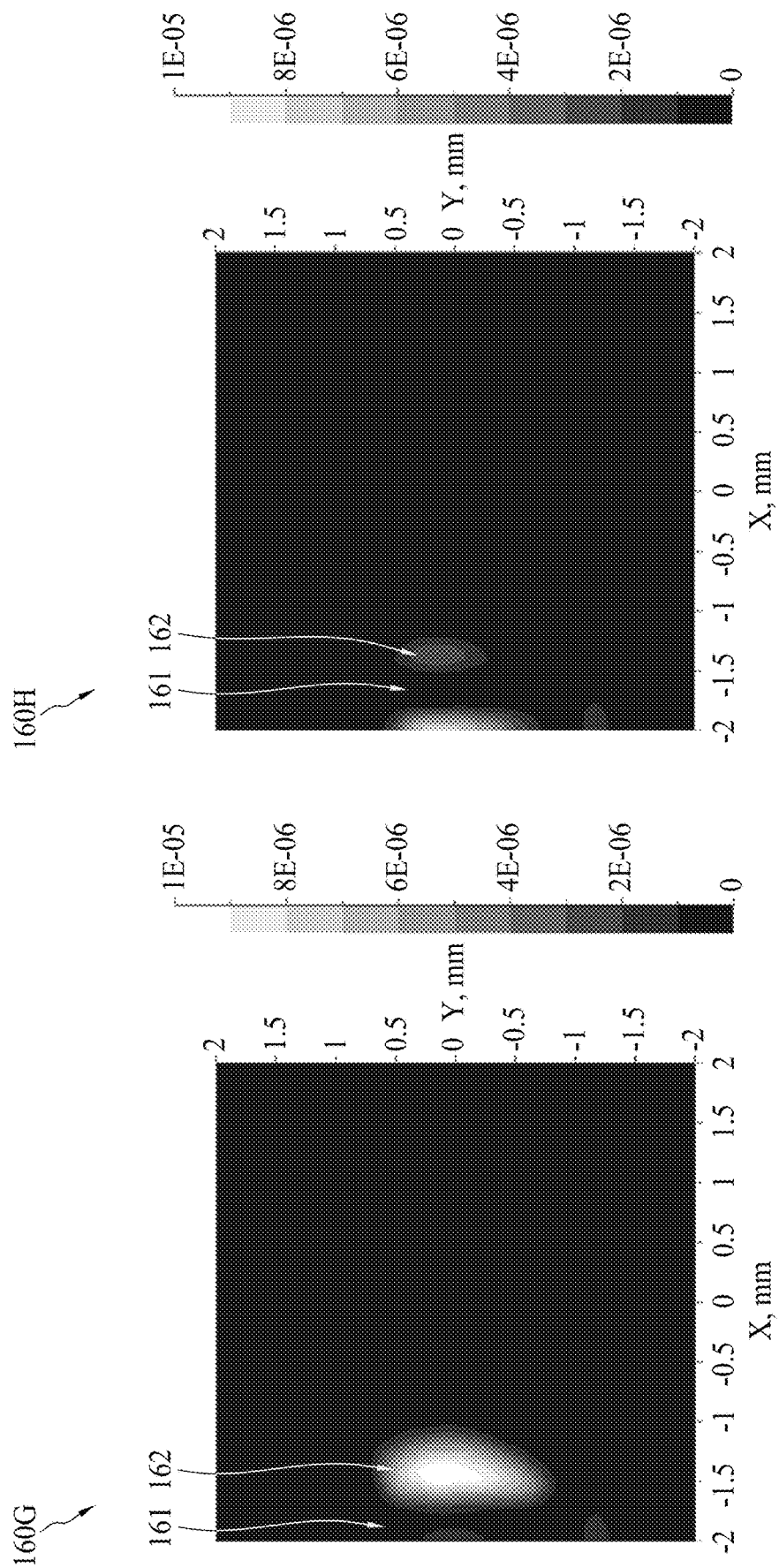

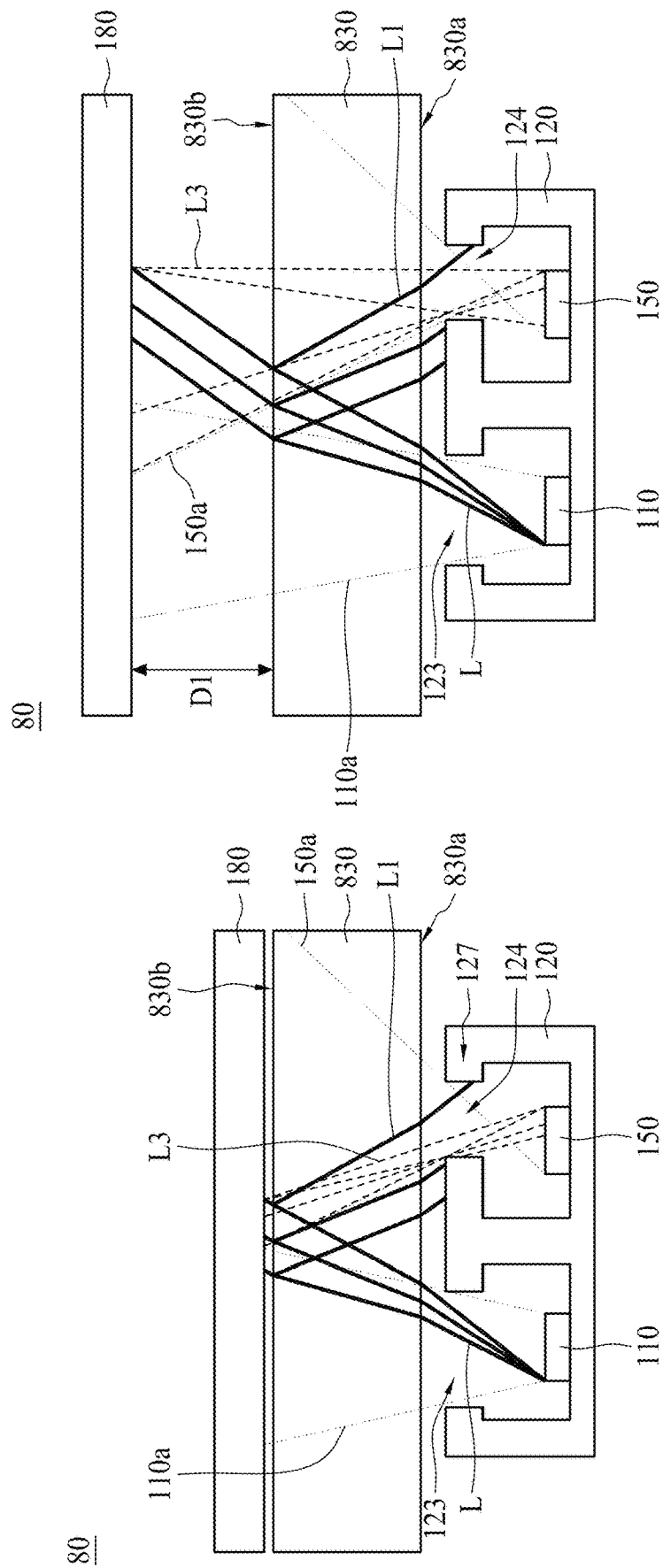

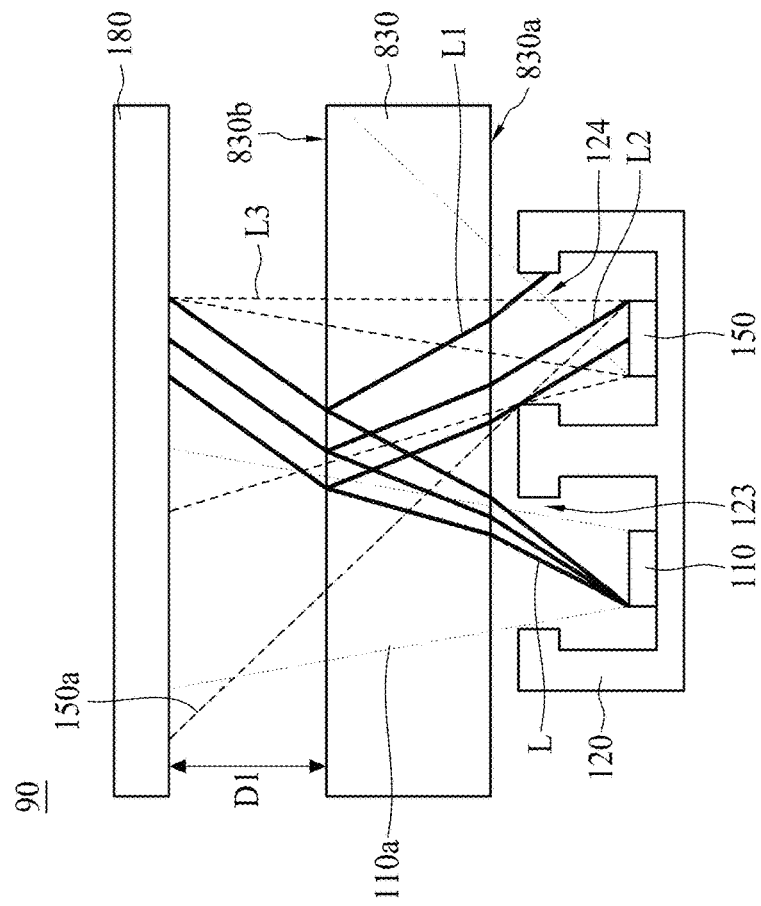
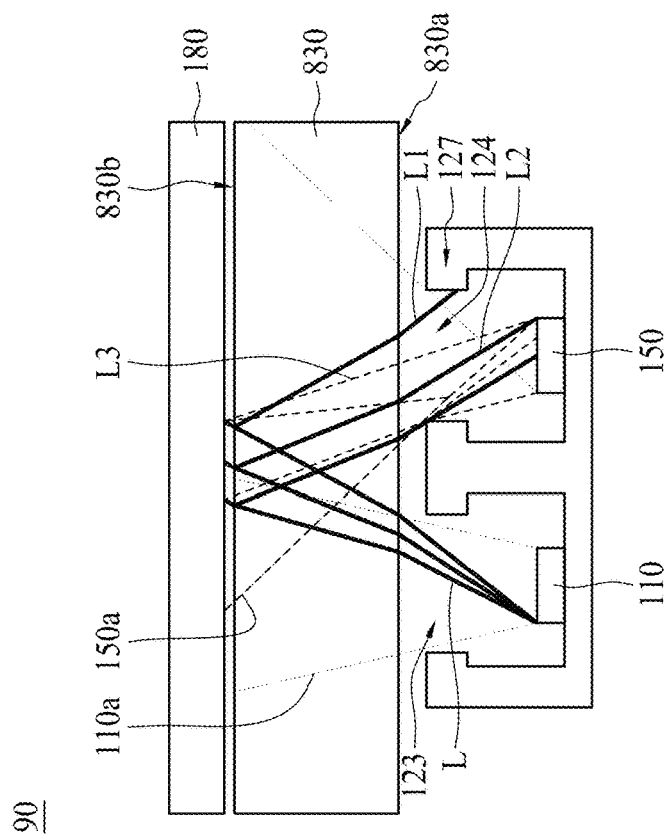
FIG. 9B
FIG. 9A

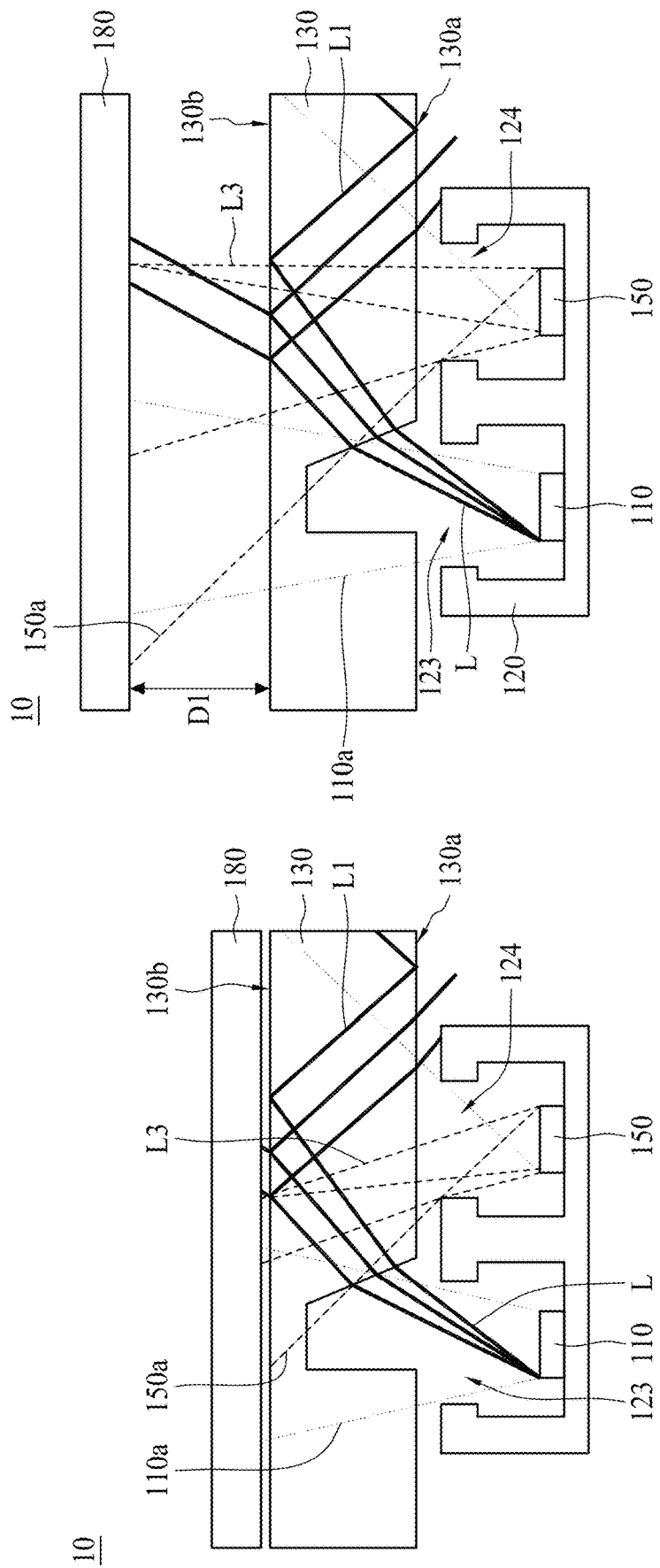

OPTICAL ASSEMBLY THAT GENERATES DISTINCTIVE IRRADIANCE PATTERN OF LIGHT

BACKGROUND

1. Technical Field

The present disclosure relates generally to an optical assembly. More particularly, the present disclosure relates to an optical assembly that generates a distinctive irradiance pattern of a light.

2. Description of the Related Art

An optical assembly, such as a proximity sensor, may be used to determine a distance from a proximity object. The optical assembly may include a light source and an optical detector, where the optical detector can receive or detect a light emitted from the light source and reflected from an object so that the relative distance between the object and the optical detector can be determined.

One of the sources of cross talk in the proximity sensor is when an optical detector receives a light that is not reflected from the object, but from other components of the optical assembly. The aforesaid cross talk can decrease sensitivity of the optical detector. It is desirable to reduce such cross talk.

SUMMARY

In one or more embodiments, an optical assembly includes a light-emitting device, a partition structure and a cover. The partition structure defines a first space for accommodating the light-emitting device. The cover is disposed over the partition structure. The cover has a first surface facing the partition structure and a second surface opposite to the first surface. A light emitted by the light-emitting device forms a first luminous intensity pattern projected on the second surface of the cover, and the first irradiance pattern includes a first dark zone traversing the first irradiance pattern.

In one or more embodiments, an optical assembly includes a light-emitting device, a partition structure and a cover. The partition structure defines a first space for accommodating the light-emitting device. The cover is disposed over the partition structure. The cover has a first surface facing the partition structure and a second surface angled with the first surface. An angle between the second surface and an extension of the first surface is from about 40° to about 65°.

In one or more embodiments, an optical assembly includes a light-emitting device, a partition structure and a cover. The partition structure defines a first space for accommodating the light-emitting device. The cover is disposed over the partition structure. The cover has a first surface facing the partition structure, a second surface opposite to the first surface, and a third surface between the first surface and the second surface. The third surface causes a light emitted by the light-emitting device to form an irradiance pattern projected on the second surface, and the irradiance pattern includes a dark zone traversing the irradiance pattern.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

FIG. 6A, FIG. 6B, FIG. 6C, FIG. 6D, FIG. 6E, FIG. 6F, FIG. 6G and FIG. 6H illustrate simulation results of irradiance patterns of various optical assemblies in accordance with some embodiments of the present disclosure;

FIG. 7A, FIG. 7B, FIG. 7C, FIG. 7D, FIG. 7E, FIG. 7F, FIG. 7G and FIG. 7H illustrate irradiance patterns of various optical assemblies in accordance with some embodiments of the present disclosure;

FIG. 8A illustrates a cross-sectional view of an optical assembly in accordance with some comparative embodiments of the present disclosure;

FIG. 8B illustrates a cross-sectional view of an optical assembly in accordance with some comparative embodiments of the present disclosure;

FIG. 9A illustrates a cross-sectional view of an optical assembly in accordance with some comparative embodiments of the present disclosure;

FIG. 9B illustrates a cross-sectional view of an optical assembly in accordance with some comparative embodiments of the present disclosure;

FIG. 10A illustrates a cross-sectional view of an optical assembly in accordance with some embodiments of the present disclosure;

FIG. 10B illustrates a cross-sectional view of an optical assembly in accordance with some embodiments of the present disclosure;

Common reference numerals are used throughout the drawings and the detailed description to indicate the same or similar elements. The present disclosure will be more apparent from the following detailed description taken in conjunction with the accompanying drawings.

DETAILED DESCRIPTION

In some embodiments, the present disclosure provides an optical assembly including a cover having a cavity over a light-emitting device. A light-detecting device is disposed adjacent and in proximity to the light-emitting device and configured to receive the signal caused by the light emitting from the light-emitting device. The one or more surfaces constituting the cavity can refract the light impinging thereon toward a predetermined direction, and avoid the light reflected from a distal surface of the cover from entering the light detecting device, so as to reduce the cross talk of the optical assembly.

In some embodiments, the cavity of the cover of present disclosure has a slanted surface which forms an angle from about 40° to about 65° with respect to a bottom surface extension of the cover. The optical assembly equipped with such cover can be provided with excellent signal intensity as well as signal-to-noise ratio.

Figure 1:
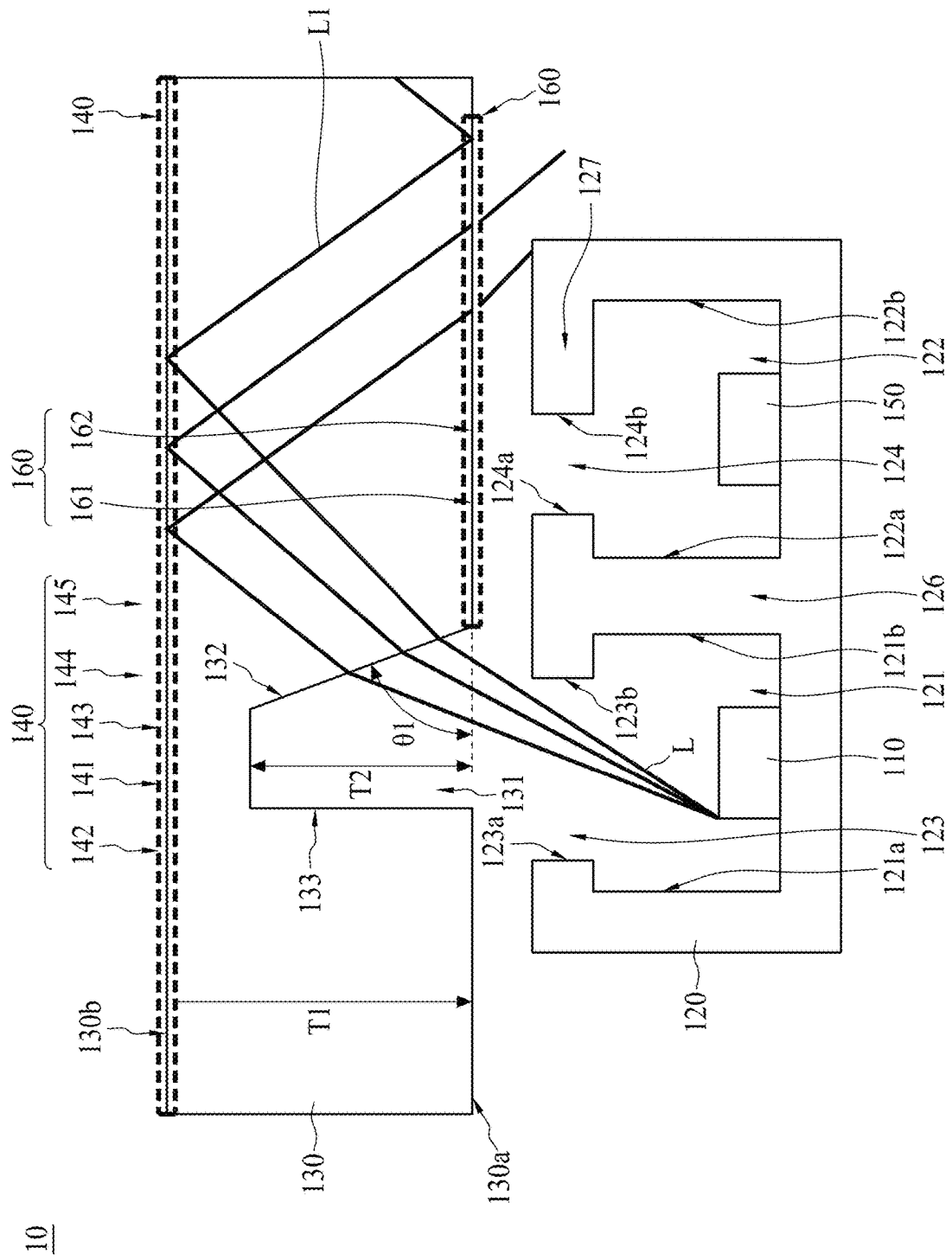
FIG. 1 illustrates a cross-sectional view of an optical assembly in accordance with some embodiments of the present disclosure.

FIG. 1 illustrates a cross-sectional view of an optical assembly 10 in accordance with some embodiments of the present disclosure. The optical assembly 10 includes a light-emitting device 110, a partition structure 120, a cover 130, and a photodetector 150. In some embodiments, the optical assembly 10 can be a proximity sensor.

The light-emitting device 110 is located in the partition structure 120. In some embodiments, the light-emitting device 110 may be or include, but not limited to, a light emitting diode (LED). In some embodiments, the light-emitting device 110 may include one or more light emitting diodes. In some embodiments, the light-emitting device 110 may include one or more light emitting diodes that emitted lights having the same peak wavelength or various peak wavelengths.

The partition structure 120 defines a space 121 for accommodating the light-emitting device 110. In some embodiments, the partition structure 120 further defines a space 122 for accommodating the photodetector 150. In some embodiments, the partition structure 120 includes a partition wall 126, and the space 121 and the space 122 are separated by the partition wall 126. In some embodiments, the partition structure 120 has an opening 123 exposing the light-emitting device 110. In some embodiments, the partition structure 120 further has an opening 124 exposing the photodetector 150.

In some embodiments, the partition structure 120 includes an enclosing wall 127 connected to the partition wall 126, and the enclosing wall 127 together with the partition wall 126 defines the space 121 and the space 122. In some embodiments, the space 121 is defined by surfaces 121a and 121b of the partition structure 120, and the space 122 is defined by surfaces 122a and 122b of the partition structure 120. In some embodiments, the opening 123 is defined by surfaces 123a and 123b of the partition structure 120, and the opening 124 is defined by surfaces 124a and 124b of the partition structure 120.

In some embodiments, the surface 121a and the surface 123a are at different elevations. In some embodiments, the surface 121a is aligned with the surface 123a (not shown in drawings). In some embodiments, the surface 122a and the surface 124a are at different elevations. In some embodiments, the surface 122a is aligned with the surface 124a (not shown in drawings). In some embodiments, the surface 124a is directly above the photodetector 150.

In some embodiments, the partition structure 120 is opaque to a peak wavelength emitted by the light-emitting device 110 or a peak wavelength configured to be received by the photodetector 150. In some embodiments, the partition structure 120 may be composed of polymeric materials, epoxy, epoxy with fillers, molding compound, or the like.

The cover 130 is disposed over the partition structure 120. In some embodiments, the cover 130 includes a cavity 131 facing the partition structure 120. In some embodiments, the cavity 131 of the cover 130 partially overlaps the opening 123 of the partition structure 120 from a top view perspective. In some embodiments, the cavity 131 of the cover 130 partially overlaps the light-emitting device 110 from a top view perspective. In some embodiments, the surface 123b that defines a portion of the opening 123 of the partition structure 120 is directly under the cavity 131. In some embodiments, the surface 123a that defines a portion of the opening 123 of the partition structure is directly under the surface 130a of the cover 130. In some embodiments, the cavity 131 has a trapezoidal cross-sectional profile.

In a comparative embodiment, where an anti-reflection (AR) coating is coated on an upper surface of a cavity-free cover of a proximity sensor, cross-talk caused by light reflected from the upper surface of the cover can be reduced. The upper surface of the cavity-free cover can be exposed to the environment and hence the AR coating can be damaged due to daily usage of the corresponding consumer product, for example, a smart watch, a mobile phone, or a panel device. According to some embodiments of the present disclosure, at least one of the surfaces of the cavity 131 can refract the light impinging thereon toward a predetermined direction, for example, as illustrated in FIG. 1, the refracted light is guided to be reflected at a location of the surface 130b more toward the right compared to the scenario where no cavity 131 is formed on the cover 130. Because the refracted light is guided to be reflected at a location of the surface 130b more toward the right, the reflected light path may avoid from entering the photodetector 150, and openings 123 and 124 of the partition structure 120 can remain relatively large which facilitates increasing the intensity of the signal of the optical assembly 10. In contrast to the comparative embodiment, the cavity 131 of the cover 130 is not prone to be damaged by daily usage of the corresponding consumer product because the cavity 131 is not exposed to the environment. The stability of the optical assembly 10 can be increased, and the effects of preventing cross-talk can be stably maintained.

In some embodiments, the cover 130 has a surface 130a facing the partition structure 120 and a surface 130b opposite to the first surface 130a. In some embodiments, the cover 130 further includes a surface 132 angled with the surface 130a. In some embodiments, the surface 132 defines a portion of the cavity 131. In some embodiments, the surface 132 at least partially overlaps the partition wall 126 of the partition structure 120. In some embodiments, the surface 132 is disposed on a light path of the light-emitting device 110. In some embodiments, a portion of the surface 132 is between the surface 123b and the surface 124b of the enclosing wall 127 of the partition structure 120. In some embodiments, an angle θ1 between the surface 132 and an extension of the surface 130a is from about 40° to about 65°. In some embodiments, the angle θ1 is from about 50° to about 60°. In some embodiments, the angle θ1 is from about 55° to about 60°. According to some embodiments of the present disclosure, the optical assembly 10 including the cavity 131 that has the above numerical range of the angle θ1 can be provided with excellent signal intensity as well as signal-to-noise ratio.

In some embodiments, the cover 130 further includes a surface 133 substantially perpendicular to the surface 130a. In some embodiments, the surface 133 defines a portion of the cavity 131. In some embodiments, the surface 133 is directly above the opening 123 of the partition structure 120. In some embodiments, the surface 133 is directly above the light-emitting device 110. In some embodiments, the optical structure 130 has a thickness T1, the cavity 131 has a depth T2, and a difference between the depth T2 of the cavity 131 and the thickness T1 of the optical structure 130 is equal to or greater than about 0.2 mm. In some embodiments, the difference between the depth T2 of the cavity 131 and the thickness T1 of the optical structure 130 is equal to or greater than about 0.15 mm.

In some embodiments, the cover 130 is transparent to a peak wavelength emitting by the light-emitting device 110 or a peak wavelength configured to be received by the photodetector 150. In some embodiments, the cover 130 has a refractive index from about 1.4 to about 1.7. In some embodiments, the cover 130 may be composed of transparent plastic, such as poly(methyl methacrylate, nylon, polycarbonate, and the like.

Figure 2B:
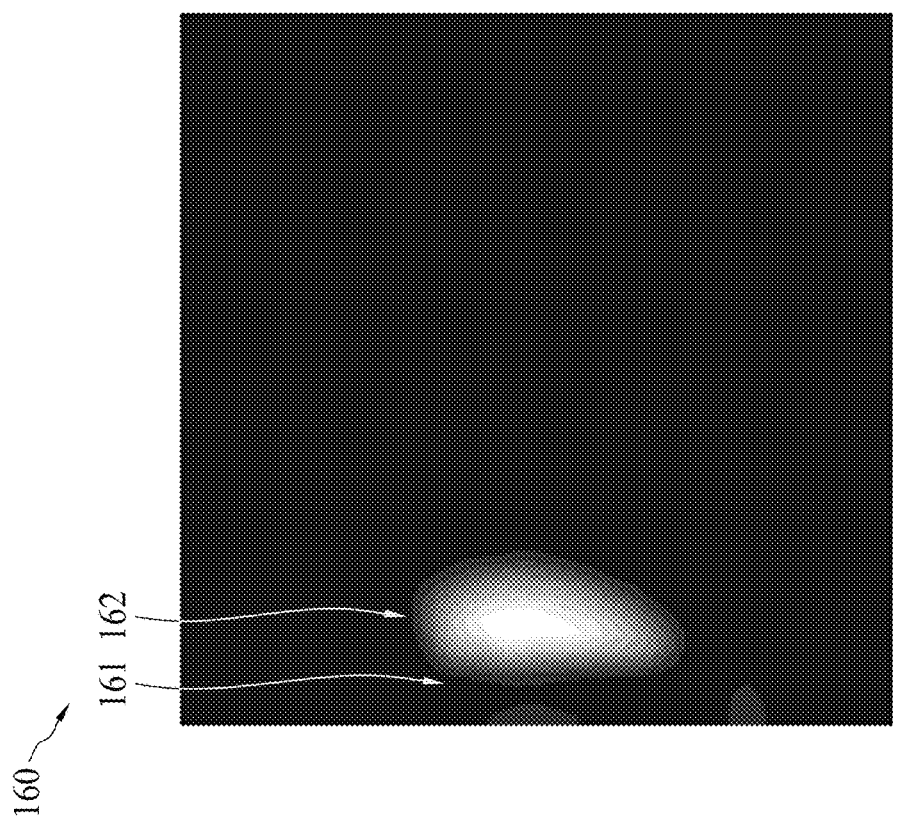
FIG. 2B illustrates an irradiance pattern of an optical assembly in accordance with some embodiments of the present disclosure.
Figure 2A:
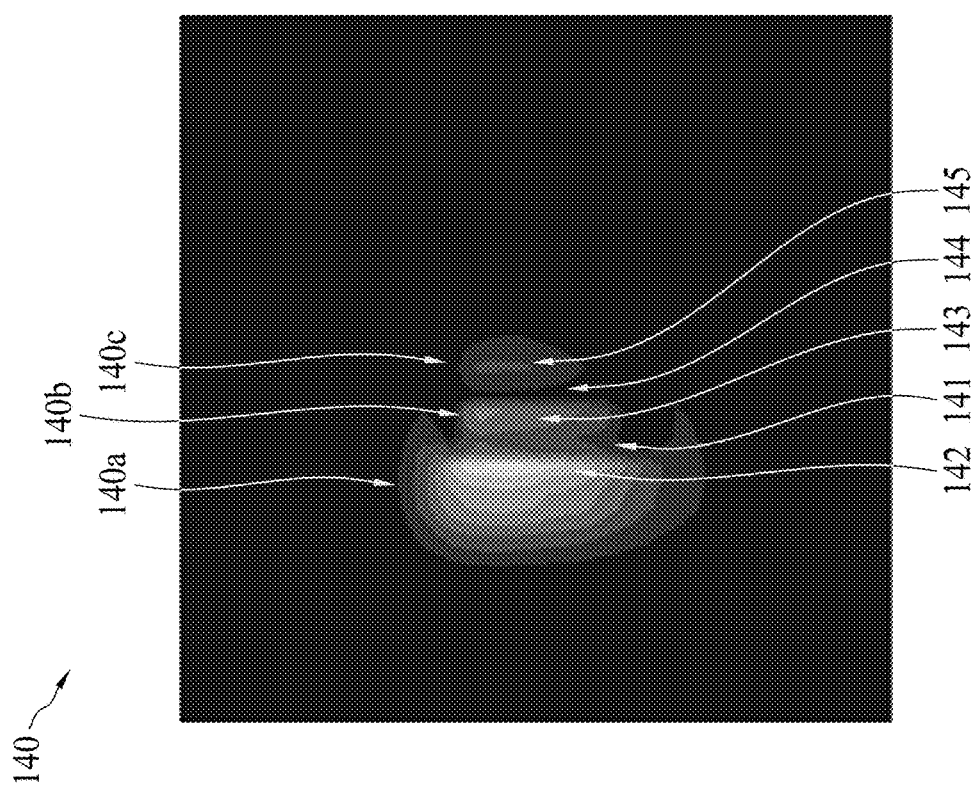
FIG. 2A illustrates an irradiance pattern of an optical assembly in accordance with some embodiments of the present disclosure.

FIG. 2A illustrates an irradiance pattern 140 of an optical assembly 10 in accordance with some embodiments of the present disclosure.

Referring to FIGS. 1 and 2A, a light emitted by the light-emitting device 110 forms an irradiance pattern 140 vertically projected on the surface 130b of the cover 130. In some embodiments, the irradiance pattern 140 is vertically projected on a region of the surface 130b denoted by a dashed box in FIG. 1. In some embodiments, the irradiance pattern 140 includes a dark zone 141 traversing the irradiance pattern 140.

According to some embodiments of the present disclosure, the dark zone 141 is caused by the structural design of the cover 130 (e.g., the cavity 131 of the cover 130), for example, the dark zone 141 may correspond to the optical path of cross-talk noise (e.g., the light reflected by the surface 130b of the cover 130 and then received by the photodetector 150) when there is no such cavity 131 on the cover 130. According to some embodiments of the present disclosure, the presence of the dark zone 141 indicates the decreased intensity of the light reflected by the surface 130b of the cover 130 and then received by the photodetector 150, such that the cross-talk of the optical assembly 10 is effectively reduced.

In some embodiments, referring to FIGS. 1 and 2A, the irradiance pattern 140 further includes a bright zone 142 adjacent to a side of the dark zone 141 away from the partition wall 126 of the partition structure 120. In some embodiments, the dark zone 141 of the irradiance pattern 140 is a region having a primary dimension. As shown in FIG. 2A, the primary dimension of the dark zone 141 extends from a top to a bottom of the irradiance pattern 140.

In some embodiments, referring to FIGS. 1 and 2A, the irradiance pattern 140 further includes a bright zone 143 adjacent to a side of the dark zone 141 proximal to the partition wall 126 of the partition structure 120. In some embodiments, the bright zone 142 and the bright zone 143 are disposed at two opposite sides of the dark zone 141. In some embodiments, the dark zone 141 is defined by the bright zone 143 and the bright zone 142 of the irradiance pattern 140.

In some embodiments, referring to FIGS. 1 and 2A, the irradiance pattern 140 further includes a dark zone 144 adjacent to a side of the bright zone 143 proximal to the partition wall 126 of the partition structure 120.

In some embodiments, referring to FIGS. 1 and 2A, the irradiance pattern 140 further includes a bright zone 145 adjacent to a side of the dark zone 144 proximal to the partition wall 126 of the partition structure 120. In some embodiments, the bright zone 143 and the bright zone 145 are disposed at two opposite sides of the dark zone 144. In some embodiments, the dark zone 144 is defined by the bright zone 143 and the bright zone 145 of the irradiance pattern 140.

In some embodiments, the irradiance pattern 140 includes a sub-pattern 140a and a sub-pattern 140b. In some embodiments, the sub-pattern 140a has a light intensity descending from center toward all directions, and the sub-pattern 140b has a light intensity descending from center toward all directions. In some embodiments, the sub-pattern 140a is adjacent to the sub-pattern 140b. In some embodiments, the dark zone 141 is defined by the sub-pattern 140a and the sub-pattern 140b. In some embodiments, a maximum light intensity of the sub-pattern 140a is different from a maximum light intensity of the sub-pattern 140b. In some embodiments, the sub-pattern 140a is away from the partition wall 126 of the partition structure 120, and the maximum light intensity of the sub-pattern 140a is greater than the maximum light intensity of the sub-pattern 140b.

In some embodiments, the irradiance pattern 140 further includes a sub-pattern 140c having a light intensity descending from center toward all directions. In some embodiments, the dark zone 144 is defined by the sub-pattern 140b and the sub-pattern 140c. In some embodiments, a maximum light intensity of the sub-pattern 140c is smaller than the maximum light intensity of the sub-pattern 140b.

FIG. 2B illustrates an irradiance pattern 160 of an optical assembly 10 in accordance with some embodiments of the present disclosure.

Referring to FIGS. 1 and 2B, a light reflected at the surface 130b of the cover 130 forms an irradiance pattern 160 projected on the surface 130a of the cover 130. In some embodiments, the irradiance pattern 160 is vertically projected on a region of the surface 130a denoted by a dashed box in FIG. 1. In some embodiments, the irradiance pattern 160 includes a dark zone 161 traversing the irradiance pattern 160.

According to some embodiments of the present disclosure, the dark zone 161 is caused by the structural design of the cover 130 (e.g., the cavity 131 of the cover 130), for example, the dark zone 161 may correspond to the optical path of cross-talk noise (e.g., the light reflected by the surface 130b of the cover 130 and then received by the photodetector 150) when there is no cavity 131 on the cover 130. In some embodiments, the dark zone 161 may overlap a portion of the opening 124 of the partition structure 120 close to the surface 124a of the partition structure 120. According to some embodiments of the present disclosure, the presence of the dark zone 161 indicates the decreased intensity of the light reflected by the surface 130b of the cover 130 and then received by the photodetector 150, such that the cross-talk of the optical assembly 10 is effectively reduced.

In some embodiments, referring to FIGS. 1 and 2B, the irradiance pattern 160 further includes a bright zone 162 adjacent to a side of the dark zone 161 away from the partition wall 126 of the partition structure 120. In some embodiments, the bright zone 162 partially overlaps the opening 124 of the partition structure 120 from a top view perspective. In some embodiments, the bright zone 162 and the opening 124 of the partition structure 120 are staggered from a top view perspective.

Figure 3:
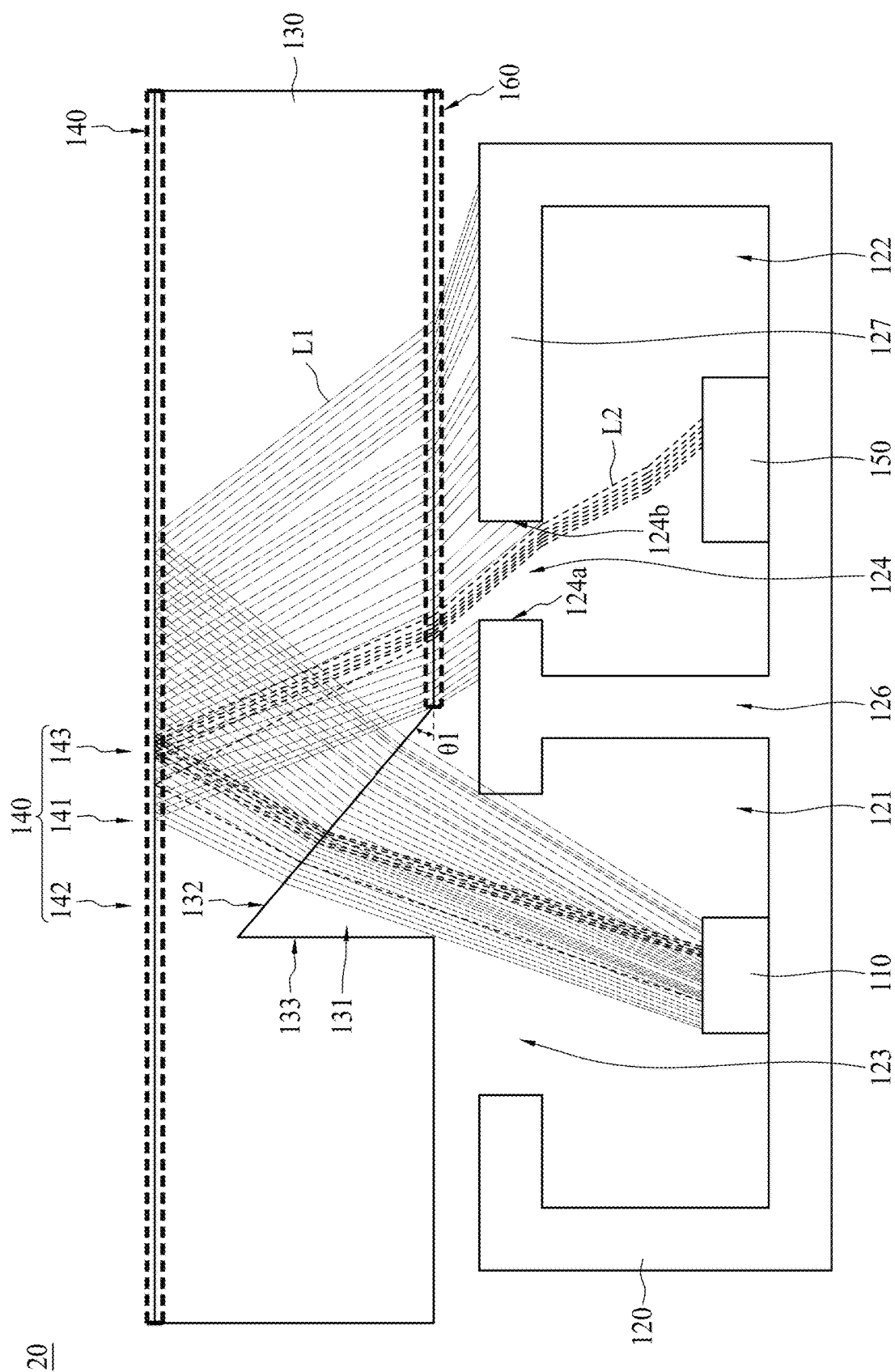
FIG. 3 illustrates a cross-sectional view of an optical assembly in accordance with some embodiments of the present disclosure.

FIG. 3 illustrates a cross-sectional view of an optical assembly 20 in accordance with some embodiments of the present disclosure. The optical assembly 20 is similar to the optical assembly 10 in FIG. 1 except that, for example, the cavity 131 of the cover 130 has a different structure.

In FIG. 3, the cavity 131 is composed of a plurality of surfaces 132 and 133. The surface 132 is directly connected to the surface 133. In some embodiments, the cavity 131 of the cover 130 has a triangular cross-sectional profile. In some embodiments, a portion of the surface 132 is directly above the light-emitting device 110.

Figure 4:
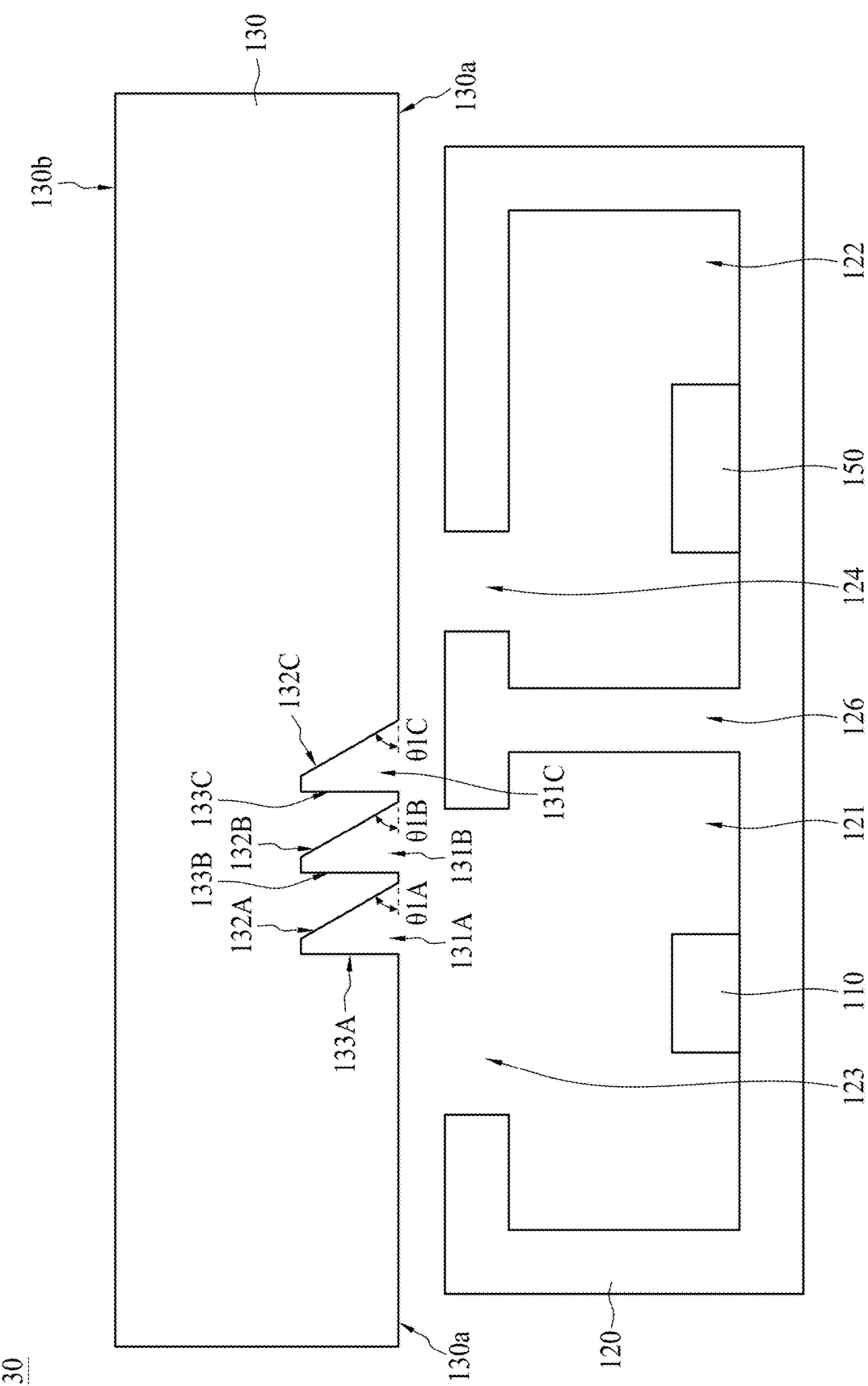
FIG. 4 illustrates a cross-sectional view of an optical assembly in accordance with some embodiments of the present disclosure.

FIG. 4 illustrates a cross-sectional view of an optical assembly 30 in accordance with some embodiments of the present disclosure. The optical assembly 30 is similar to the optical assembly 10 in FIG. 1 except that, for example, the cavities 131A, 131B, 131C of the cover 130 have a different structure.

In some embodiments, the cover 130 has a plurality of the surfaces (e.g., surfaces 132A, 132B and 132C) angled with the surface 130a of the optical structure 130. In some embodiments, the surfaces 132A, 132B and 132C are substantially parallel to one another. In some embodiments, two or more of the surfaces 132A, 132B and 132C are not parallel to each other. In some embodiments, an angle θ1A between the surface 132A and an extension of the surface 130a is from about 40° to about 65°. In some embodiments, the angle θ1A is from about 50° to about 60°. In some embodiments, an angle θ1B between the surface 132B and an extension of the surface 130a is from about 40° to about 65°. In some embodiments, the angle θ1B is from about 50° to about 60°. In some embodiments, an angle θ1C between the surface 132C and an extension of the surface 130a is from about 40° to about 65°. In some embodiments, the angle θ1C is from about 50° to about 60°. In some embodiments, the angles θ1A, θ1B and θ1C may be the same. In some embodiments, two or more of the angles θ1A, θ1B and θ1C may be different from each other.

In some embodiments, the cover 130 includes a plurality of cavities (e.g., cavities 131A, 131B and 131C) facing the partition structure 120. In some embodiments, the surfaces (e.g., surfaces 132A, 132B and 132C) define portions of the cavities (e.g., cavities 131A, 131B and 131C).

Figure 5:
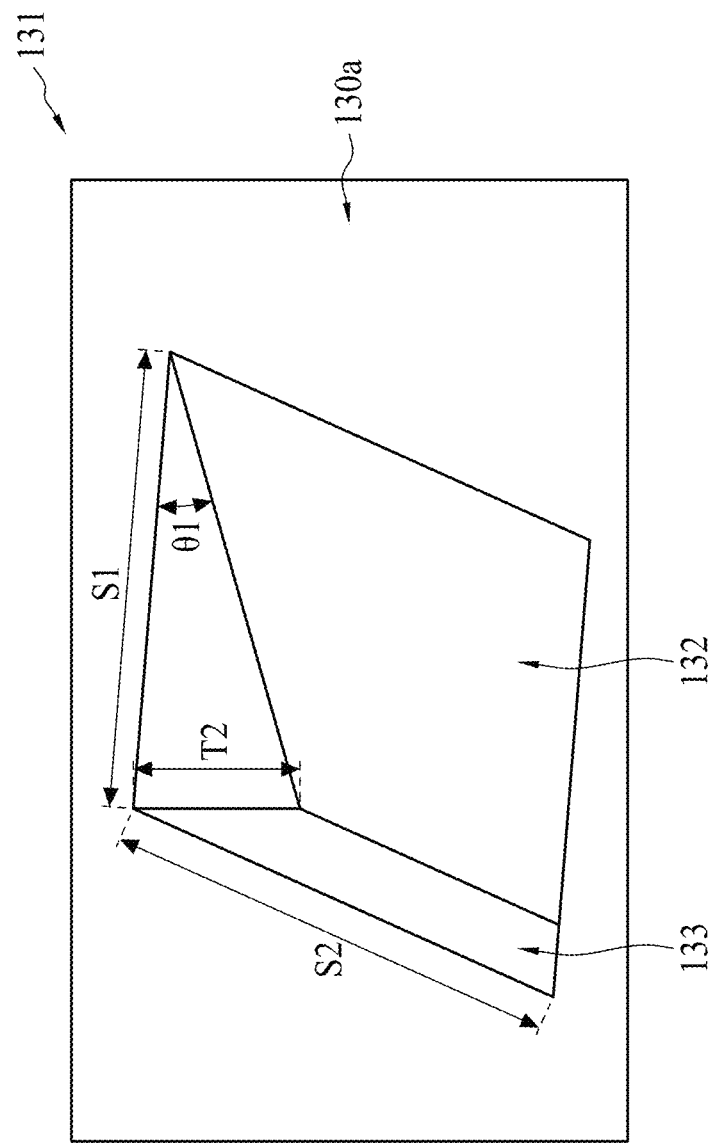
FIG. 5 illustrates a perspective view of a cavity of an optical assembly in accordance with some embodiments of the present disclosure.

FIG. 5 illustrates a perspective view of a cavity 131 of an optical assembly 20 in accordance with some embodiments of the present disclosure.

The cavity 131 has an opening defined by a side S1 and a side S2 angled with the side S1. In some embodiments, the side S2 defines a portion of the surface 133. In some embodiments, the side S1 defines a portion of the angle θ1.

FIGS. 6A, 6B, 6C, 6D, 6E, 6F, 6G and 6H illustrate simulation results of irradiance patterns of various optical assemblies in accordance with some embodiments of the present disclosure. In some embodiments, referring to FIG. 1, each of FIGS. 6A, 6B, 6C, 6D, 6E, 6F, 6G and 6H illustrates an irradiance pattern formed by a light emitted by the light-emitting device 110 of an optical assembly, and each of the covers 130 of the optical assemblies for the irradiance patterns illustrated in FIGS. 6A, 6B, 6C, 6D, 6E, 6F, 6G and 6H has a different structure. The vertical bars in FIGS. 6A, 6B, 6C, 6D, 6E, 6F, 6G and 6H provide reference to indicate relative light intensities of different regions in the irradiance patterns. The details of the structures of the covers 130 are listed in table 1.

TABLE 1

| FIGS. | 5A | 6B | 6C | 6D | 5E | 6F | 6G | 6H |
|---|---|---|---|---|---|---|---|---|
| Angle θ1 of Cavity of Cover | No cavity | 10° | 20° | 30° | 40° | 50° | 60° | 70° |

In the embodiment as illustrated in FIG. 6A, the cover 130 has no cavity. As shown in FIG. 6A, the irradiance pattern does not include any dark zone.

In some embodiments as illustrated in FIGS. 6B, 6C, 6D, 6E, 6F and 6H, the covers 130 have cavities 131 with angles θ1 of 10°, 20°, 30°, 40°, 50° and 70°, respectively. As shown in FIGS. 6B, 6C, 6D, 6E, 6F and 6H, each of the irradiance patterns 140B, 140C, 140D, 140E, 140F and 140H includes a sub-pattern 140a and a sub-pattern 140b. As shown in FIGS. 6B, 6C, 6D, 6E, 6F and 6H, each of the irradiance patterns 140B, 140C, 140D, 140E, 140F and 140H includes a dark zone 141 and two bright zones 142 and 143 adjacent to two opposite sides of the dark zone 141.

In the embodiment as illustrated in FIG. 6G, the cover 130 has a cavity 131 with an angles θ1 of 60°. As shown in FIG. 6G, the irradiance pattern 140G includes a sub-pattern 140a, a sub-pattern 140b and a sub-pattern 140c. As shown in FIG. 6G, the irradiance pattern 140G includes dark zones 141 and 144 and bright zones 142, 143 and 145, the bright zones 142 and 143 are adjacent to two opposite sides of the dark zone 141, and the bright zones 143 and 145 area adjacent to two opposite sides of the dark zone 144.

FIG. 7A, FIG. 7B, FIG. 7C, FIG. 7D, FIG. 7E, FIG. 7F, FIG. 7G and FIG. 7H illustrates irradiance patterns of various optical assemblies in accordance with some embodiments of the present disclosure. In some embodiments, referring to FIG. 1, each of FIGS. 7A, 7B, 7C, 7D, 7E, 7F, 7G and 7H illustrates an irradiance pattern formed by a light emitted by the light-emitting device 110 of an optical assembly, and each of the covers 130 of the optical assemblies for the irradiance patterns illustrated in FIGS. 7A, 7B, 7C, 7D, 7E, 7F, 7G and 7H has a different structure. The vertical bars in FIGS. 7A, 7B, 7C, 7D, 7E, 7F, 7G and 7H provide reference to indicate relative light intensities of different regions in the irradiance patterns. The details of the structures of the covers 130 are listed in table 2.

TABLE 2

| FIGS. | 7A | 7B | 7C | 7D | 7E | 7F | 7G | 7H |
|---|---|---|---|---|---|---|---|---|
| Angle θ1 of Cavity of Cover | No cavity | 10° | 20° | 30° | 40° | 50° | 60° | 70° |

Figure 7B:
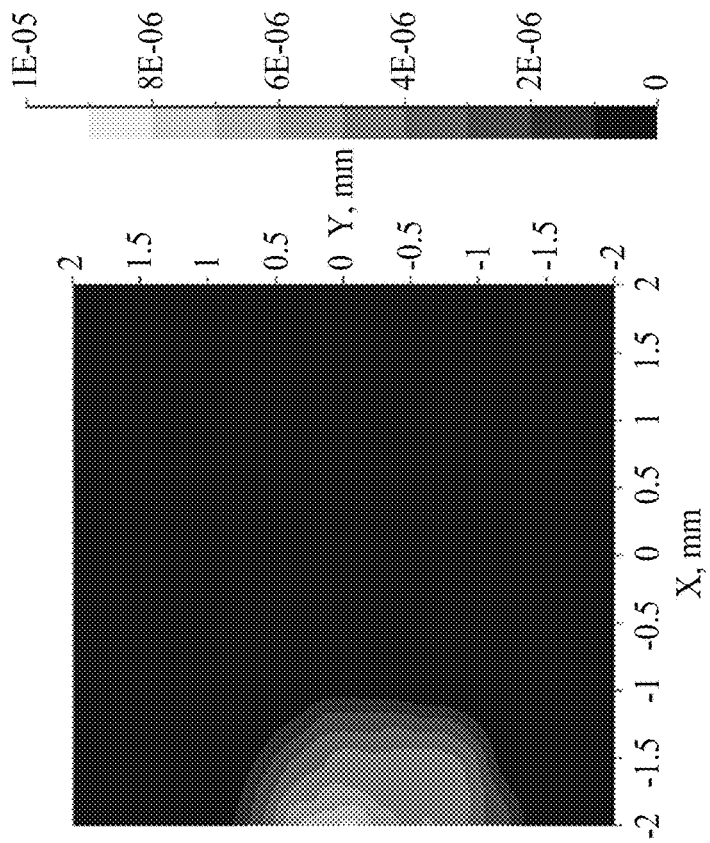
Figure 7A:
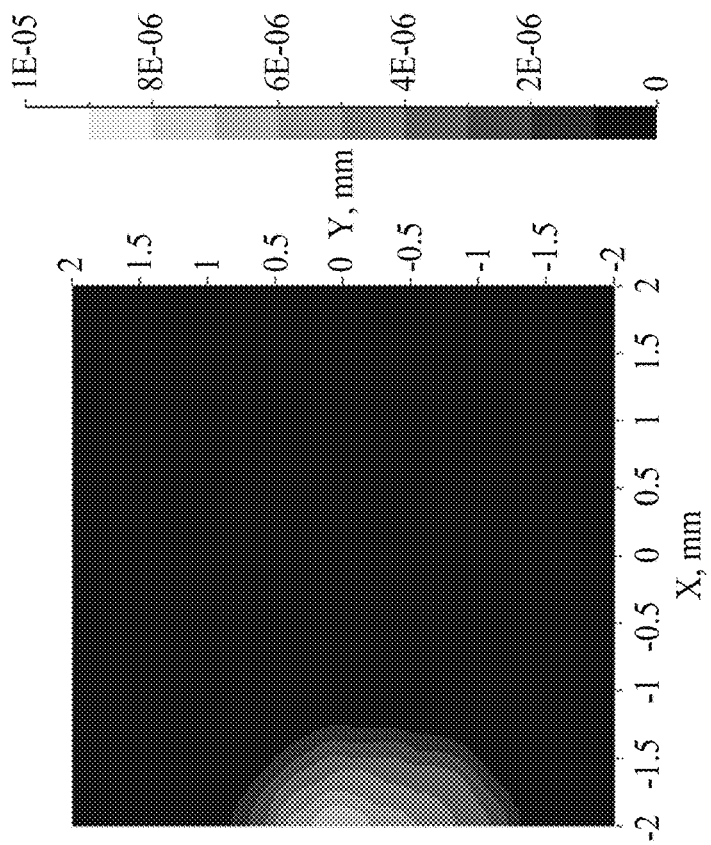

In the embodiment as illustrated in FIG. 7A, the cover 130 has no cavity. As shown in FIG. 7A, the irradiance pattern does not include any dark zone. In the embodiment as illustrated in FIG. 7B, the cover 130 has a cavity 131 with an angles θ1 of 10°. As shown in FIG. 7B, the irradiance pattern does not include any dark zone.

Figures 7E, 7F:
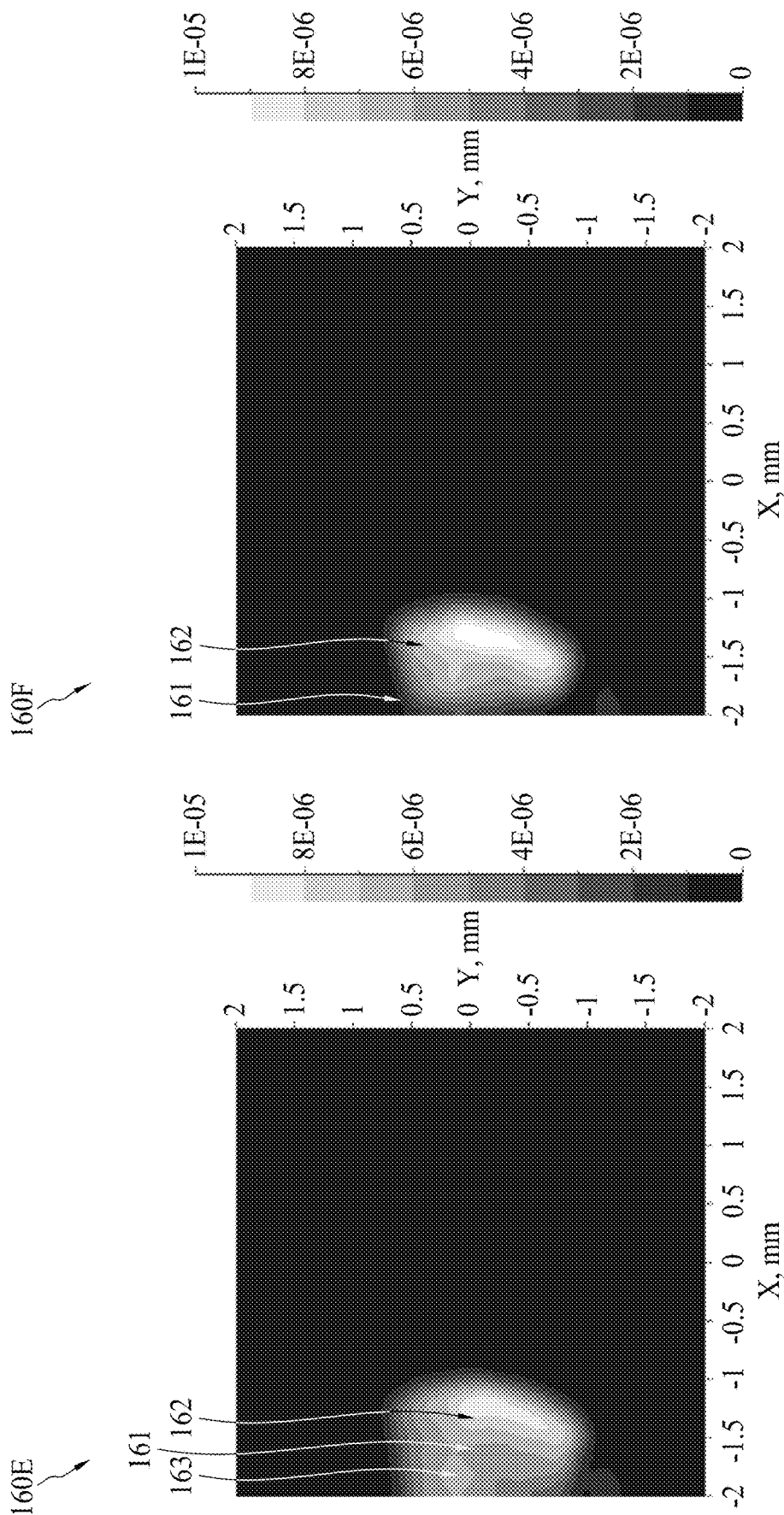

In some embodiments as illustrated in FIGS. 7F and 7G, the covers 130 have cavities 131 with angles θ1 of 50° and 60°, respectively. As shown in FIGS. 7F and 7G, each of the irradiance patterns 160F and 160G includes a dark zone 161 and a bright zone 162 adjacent to the dark zone 161. As shown in FIGS. 7F and 7G, the bright zone 162 has a light intensity descending from center to all directions.

In some embodiments as illustrated in FIGS. 7C, 7D, 7E and 7H, the covers 130 have cavities 131 with angles θ1 of 20°, 30°, 40° and 70°, respectively. As shown in FIGS. 7C, 7D, 7E and 7H, each of the irradiance patterns 160C, 160D, 160E and 160H includes a dark zone 161 and two bright zones 162 and 163 adjacent to two opposite sides of the dark zone 161. As shown in FIGS. 7C, 7D, 7E and 7H, the bright zone 162 has a light intensity descending from center to all directions, and the bright zone 163 has a light intensity descending from center to all directions. As shown in FIGS.

7D and 7E, a maximum light intensity of the bright zone 162 is greater than a maximum light intensity of the bright zone 163. As shown in FIG. 7H, a maximum light intensity of the bright zone 163 is greater than a maximum light intensity of the bright zone 162.

Presented below are simulation results of exemplary embodiments to further show the properties and advantages of the optical assemblies in accordance with some embodiments of the present disclosure. The simulations were performed using Monte Carol ray tracing software.

FIGS. 8A and 8B illustrate cross-sectional views of an optical assembly 80 in accordance with some comparative embodiments of the present disclosure. In the embodiments as illustrated in FIGS. 8A and 8B, the cover 830 does not have a cavity. In FIG. 8A (comparative embodiment E1), a target object 180 is spaced from the cover 830 with a closer distance (e.g., a distance from about 0 mm to about 0.1 mm). In FIG. 8B (comparative embodiment E2), a target object 180 is spaced from the cover 830 with a further distance D1. FIGS. 8A and 8B show the simulated optical paths of lights emitted from the light-emitting device 110. Simulation results of optical properties of the embodiments as illustrated in FIGS. 8A and 8B are presented below in table 3. In the following simulations, the thickness of the cover 830 is set at 0.6 mm, the refractive index of the cover 830 is set at 1.58, and "Power received as signal" and "Power received as noise" are the simulated values of power of lights detected by the photodetector 150.

TABLE 3

| | D1 (mm) | Opening | Power received as signal (nW) | Power received as noise (nW) | Signal-to-noise ratio |
|---|---|---|---|---|---|
| E1 (FIG. 8A) | 0 | Small | 1.36 | 0.06 | 22 |
| E1 (FIG. 8B) | 1 | Small | 29.9 | 0.06 | 476 |

As shown in FIG. 8A, lights L emitted by the light-emitting device 110 and out of the partition structure 120 through the opening 123 form a light-emitting cone 110a which covers the region of the target object 180 illuminated by the lights L. A portion of the lights L are reflected by the surface 830b of the cover 830 to form lights L1 (i.e., noises) that propagate towards the partition structure 120. A portion of the light L are scattered by the target object 180 to form lights L3 (i.e., signals) that propagate towards the photodetector 150. The amount of the lights L3 (i.e., signals) that can be detected by the photodetector 150 may be dependent on the size of the opening 124 of the partition structure 120. In some embodiments, the amount of power received as signal may be dictated by the degree of overlap between the light-receiving cone 150a and the light-emitting cone 110a at the target object 180. The dimension of the light-emitting cone 110a is related to the size of the opening 123 of the partition structure 120, whereas the dimension of the light-receiving cone 150a is related to the size of the opening 124 of the partition structure 120.

In the comparative embodiment (E1) as illustrated in FIG. 8A, under the circumstance when the target object 180 is close to the cover 830, the overlap of the light-receiving cone 150a and the light-emitting cone 110a is relatively small (or approximately no overlap). As such, as shown in table 3, although the noise received by the photodetector 150 (power received as noise) is low, partially due to the blockage of the light L3 by the enclosing wall 127, the signal received by the photodetector 150 (power received as signal) is also low, and resulting in a relatively low signal-to-noise ratio (SNR). In the comparative embodiment (E2) as illustrated in FIG. 8B, as the distance D1 between the target object 180 and the cover 830 is increased, the overlap of the light-receiving cone 150a and the light-emitting cone 110a is increased. As such, as shown in table 3, although the noise received by the photodetector 150 (power received as noise) is comparable to the one in FIG. 8A, the signal received by the photodetector 150 (power received as signal) is increased, resulting in a higher signal-to-noise ratio (SNR).

Assuming the target object 180 approaching the optical assembly 80 from a distant location (e.g., 5 cm or further), ideally the SNR should be from nearly zero and monotonically increase along with the approaching of such target object 180. However, as demonstrated in FIG. 8A, when the distance D1 between the target object 180 and the optical assembly 80 becomes too close (e.g., closer than 1 mm), the SNR decreases. The determination of the distance D1 of the target object 180 can be affected due to such weakened SNR, and thus threshold misjudgment occurs, e.g., certain function of the mobile device may not be activated when user comes too close to the mobile device because the SNR is low.

FIGS. 9A and 9B illustrate cross-sectional views of an optical assembly 90 in accordance with some comparative embodiments of the present disclosure. In the comparative embodiments as illustrated in FIGS. 9A and 9B, the cover 830 does not have a cavity. In FIG. 9A (comparative embodiment E3), a target object 180 is spaced from the cover 830 with a closer distance (e.g., a distance from about 0 mm to about 0.1 mm). In FIG. 9B (comparative embodiment E4), a target object 180 is spaced from the cover 830 with a further distance D1. FIGS. 9A and 9B show the simulated optical paths of lights emitted from the light-emitting device 110. The difference between the comparative embodiments E1-E2 and the comparative embodiments E3-E4 is in the size of the opening 124 of the partition structure 120.

Simulation results (E3-E4) of optical properties of the comparative embodiments as illustrated in FIGS. 9A and 9B are presented below in table 4. The simulations are performed adopting the sizes of the opening 124 that are greater than that adopted in the simulations of comparative embodiments E1 and E2. In the following simulations, the thickness of the cover 830 is set at 0.6 mm, the refractive index of the cover 830 is set at 1.58, and "Power received as signal" and "Power received as noise" are the simulated values of power of lights detected by the photodetector 150.

TABLE 4

| | D1 (mm) | Opening | Power received as signal (nW) | Power received as noise (nW) | Signal-to-noise ratio |
|---|---|---|---|---|---|
| E3 (FIG. 9A) | 0 | Large | 85.9 | 73.7 | 1.16 |
| E4 (FIG. 9B) | 1 | Large | 87.7 | 73.7 | 1.19 |

As shown in FIG. 9A, a portion of the lights L are reflected by the surface 830b of the cover 830 to form lights L1 (i.e., noises) that propagate towards the partition structure 120 and lights L2 (i.e., noise) that propagate towards the photodetector 150. A portion of the light L are scattered by the target object 180 to form lights L3 (i.e., signals) that propagate towards the photodetector 150. The amount of the lights L3 (i.e., signals) that can be detected by the photodetector 150 may be dependent on the size of the opening 124 of the partition structure 120. In some embodiments, the amount of power received as signal may be dictated by the degree of overlap between the light-receiving cone 150a and the light-emitting cone 110a at the target object 180. The dimension of the light-emitting cone 110a is related to the size of the opening 123 of the partition structure 120, whereas the dimension of the light-receiving cone 150a is related to the size of the opening 124 of the partition structure 120.

In the comparative embodiment (E3) as illustrated in FIG. 9A, the overlap of the light-receiving cone 150a and the light-emitting cone 110a is greater than that shown in FIG. 8A, indicating the openings 123 and 124 of the partition structure 120 being relatively big. As such, as shown in table 4, the signal (i.e., lights L3) received by the photodetector 150 is increased; however, the noise (i.e., lights L2) received by the photodetector 150 is increased as well, resulting in a relatively low signal-to-noise ratio (SNR). In the comparative embodiment (E4) as illustrated in FIG. 9B, despite that the distance D1 between the target object 180 and the cover 830 is increased, the relatively larger size of the opening 124 plays a major role in both the increased amount of the signal and the noise received by the photodetector 150. As such, as shown in table 4, the noise (i.e., lights L2) received by the photodetector 150 and the signal (i.e., lights L3) received by the photodetector 150 are both increased, resulting in a relatively low signal-to-noise ratio (SNR).

Comparative embodiments shown and discussed in FIG. 8A, FIG. 8B, FIG. 9A, and FIG. 9B show that tweaking with the opening of the partition structure 120 may not effectively raise the SNR under the distal and close target object scenarios. For example, the small opening 124 of FIG. 8A and FIG. 8B may well serve the purpose of blocking some of the power received as noise, however, at the expense of blocking substantial amount of the power received as signal. The SNR is particularly low under close target object scenario because the overlap of the light-emitting cone 110a and the light-receiving cone 150a is seriously insufficient, rendering the power received as signal even lower. On the other hand, the large opening 124 of FIG. 9A and FIG. 9B may well serve the purpose of gaining power received as signal, however, at the same time, the large opening gains power received as noise. The SNR is not particularly low under close target object scenario with respect to the distal target object scenario, however, the overall SNR is unsatisfactory compared to the small opening design in FIG. 8A and FIG. 8B.

FIGS. 10A and 10B illustrate cross-sectional views of an optical assembly 10 in accordance with some embodiments of the present disclosure. In the embodiments as illustrated in FIGS. 10A and 10B, the cover 130 has a cavity 131. In FIG. 10A (embodiments E5 and E7), a target object 180 is spaced from the cover 130 with a closer distance (e.g., a distance from about 0 mm to about 0.1 mm). In FIG. 10B (embodiments E6 and E8), a target object 180 is spaced from the cover 130 with a further distance D1. FIGS. 10A and 10B show the simulated optical paths of lights emitted from the light-emitting device 110.

Two sets of simulation results (E5-E6 and E7-E8) of optical properties of the embodiments as illustrated in FIGS. 10A and 10B are presented below in table 5. The two sets of simulations are performed adopting different angles θ1 of the cavities 131, and the sizes of the opening 124 of the two sets of simulations of embodiments 5-8 are both greater than that adopted in the simulations of comparative embodiments E1 and E2. In the following simulations, referring to FIGS. 1 and 5, the thickness T1 of the cover 130 is set at 0.6 mm, the depth T2 of the cavity 131 is set at 0.4 mm, the side S1 of the cavity 131 is set at 0.8 mm, the side S2 of the cavity 131 is set at 1.0 mm, and the refractive index of the cover 130 is set at 1.58. "Power received as signal" and "Power received as noise" are the simulated values of power of lights detected by the photodetector 150.

TABLE 5

| | D1 (mm) | Angle θ1 (°) | Power received as signal (nW) | Power received as noise (nW) | Signal-to-noise ratio |
| --- | --- | --- | --- | --- | --- |
| E5 (FIG. 10A) | 0 | 55 | 54.1 | 2.0 | 26.6 |
| E6 (FIG. 10B) | 1 | 55 | 45.1 | 2.0 | 22.2 |
| E7 (FIG. 10A) | 0 | 60 | 35.6 | 0.8 | 42.2 |
| E8 (FIG. 10B) | 1 | 60 | 44.6 | 0.8 | 52.9 |

As shown in FIG. 10A, a portion of the lights L are reflected by the surface 130b of the cover 130 to form lights L1 (i.e., noises) that propagate towards the partition structure 120, and a portion of the lights L are scattered by the target object 180 to form lights L3 (i.e., signals) that propagate towards the photodetector 150. In some embodiments, the amount of power received as signal may be dictated by the degree of overlap between the light-receiving cone 150a and the light-emitting cone 110a at the target object 180.

In the embodiment (E6 and E8) as illustrated in FIG. 10B, the overlap of the light-receiving cone 150a and the light-emitting cone 110a is relatively big (e.g., bigger than that shown in FIG. 8B), indicating the openings 123 and 124 of the partition structure 120 being relatively big. As such, as shown in table 5, the signal (i.e., lights L3) received by the photodetector 150 is increased. In addition, due to the design of the cavity 131 of the cover 130, the lights L are reflected by the surface 130b of the cover 130 and then mostly propagate towards away from the opening 124 of the partition structure 120 (i.e. lights L1), and thus the noise (i.e., lights L2) received by the photodetector 150 is significantly decreased, resulting in a relatively high signal-to-noise ratio (SNR) and reduced cross-talk.

In the embodiment (E5 and E7) as illustrated in FIG. 10A, a target object 180 is spaced from the cover 130 with a closer distance (e.g., a distance from about 0 mm to about 0.1 mm), and thus the overlap of the light-receiving cone 150a and the light-emitting cone 110a is relatively small as compared to that in FIG. 10B. Despite the above, due to the design of the cavity 131 of the cover 130, the lights L are reflected by the surface 130b of the cover 130 and then mostly propagate towards away from the opening 124 of the partition structure 120 (i.e. lights L1), and thus the noise (i.e., lights L2) received by the photodetector 150 is significantly decreased, resulting in a relatively high signal-to-noise ratio (SNR) and reduced cross-talk.

In addition, in the embodiments (E5-E8) as illustrated in FIGS. 10A and 10B, the noise received by the photodetector 150 is very low (e.g., 2.0 nW for E5-E6 and 0.8 nW for E7-E8), such that the threshold of the sensitivity of the optical assembly 10 can be set at a relative low value, the window of received signal can be increased accordingly, and thus the resolution of the optical assembly 10 can be significantly increased.

Embodiments shown and discussed in FIG. 10A and FIG. 10B show that implementing a cavity on the partition structure 120 may effectively raise the SNR under the distal and close target object scenarios. For example, the light L impinging on a slanted surface of the cavity is refracted toward a predetermined direction, for example, as illustrated in FIG. 10A, the refracted light is guided to be reflected at a location of the surface 130b more toward the right compared to the scenario where no cavity 131 is formed on the cover 130. Due to the light reflection location is shifted toward the right, or in the illustrated embodiment, shifted toward the upper projection of the photodetector 150, less amount of the noise is received by the photodetector 150. With the large opening 124 receiving substantial amount of signal, and the cavity structure reducing the noise, embodiments illustrated in FIG. 10A and FIG. 10B show high SNR under both distal and close target object 180 scenarios.

Figure 11:
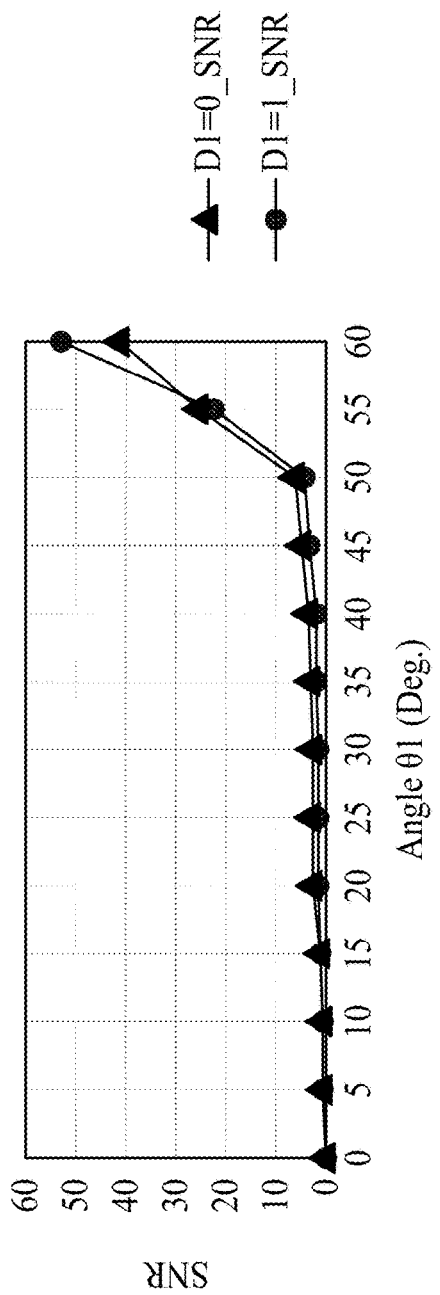
FIG. 11 shows signal-to-noise ratios (SNR) with respect to tilt angles of cavities of covers of optical assemblies in accordance with some embodiments of the present disclosure.
Figure 12:
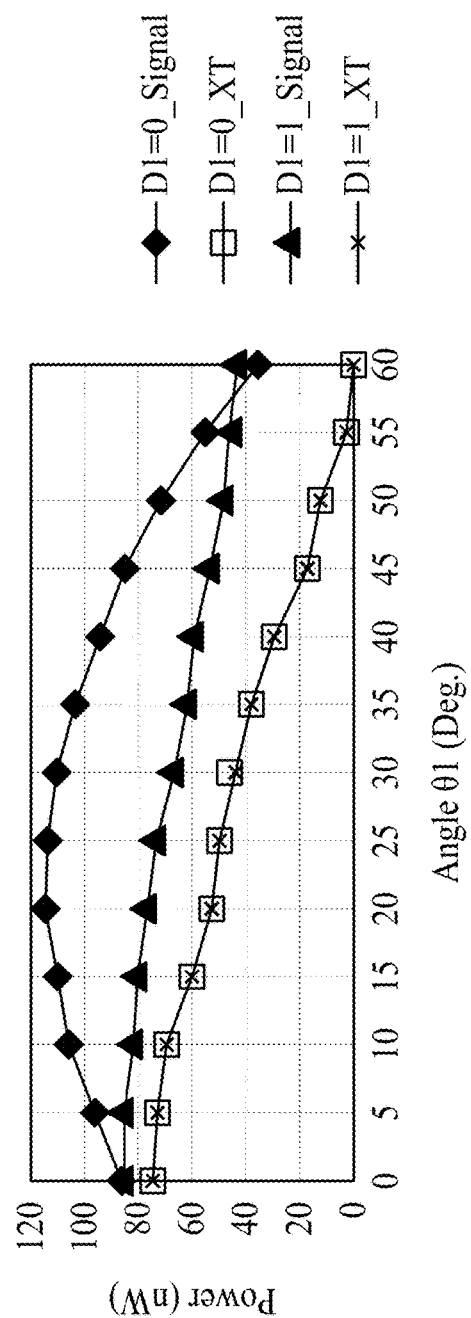
FIG. 12 shows power received by the photodetector with respect to tilt angles of cavities of covers of optical assemblies in accordance with some embodiments of the present disclosure.

FIG. 11 shows signal-to noise ratios (SNR) with respect to tilt angles (i.e., angle θ1) of cavities 131 on the cover 130 of optical assemblies in accordance with some embodiments of the present disclosure, and FIG. 12 shows power received by the photodetector with respect to tilt angles (i.e., angle θ1) of cavities 131 of covers 130 of optical assemblies in accordance with some embodiments of the present disclosure. In FIGS. 11 and 12, the curves denoted with "D1=0_Signal" represent the power values of signals received by photodetectors 150 for covers of optical assemblies having cavities with angles θ1 of 0° (indicating having no cavity), 5°, 10°, 15°, 20°, 25°, 30°, 35°, 40°, 45°, 50°, 55° and 60°, respectively, and separated from a target object by a distance of substantially 0 mm; the curves denoted with "D1=0_XT" represent the power values of noise received by photodetectors 150 for covers of optical assemblies having cavities with angles θ1 of 0° (indicating having no cavity), 5°, 10°, 15°, 20°, 25°, 30°, 35°, 40°, 45°, 50°, 55° and 60°, respectively, and separated from a target object by a distance of substantially 0 mm; the curve denoted with "D1=1_Signal" represent the power values of signals received by photodetectors 150 for covers of optical assemblies having cavities with angles θ1 of 0° (indicating having no cavity), 5°, 10°, 15°, 20°, 25°, 30°, 35°, 40°, 45°, 50°, 55° and 60°, respectively, and separated from a target object by a distance of about 1 mm; and the curve denoted with "D1=1_XT" represent the power values of noise received by photodetectors 150 for covers of optical assemblies having cavities with angles θ1 of 0° (indicating having no cavity), 5°, 10°, 15°, 20°, 25°, 30°, 35°, 40°, 45°, 50°, 55° and 60°, respectively, and separated from a target object by a distance of about 1 mm.

As shown in FIG. 11, the SNR rapidly increased as the angle θ1 of the cavity 131 of the cover 130 is equal to or greater than 50°. In the embodiments as illustrated in FIGS. 11 and 12, the optical assemblies with the angle θ1 of the cavity 131 of the cover 130 ranging from about 50° to about 60° show excellent SNR. In addition, as shown in FIG. 12, the signal intensity under D1=0 shows a local maximum at the angle θ1 of about 20° and gradually decreases when the angle θ1 increases. The signal intensity under D1=1 shows a similar trend except that no local maximum can be identified. To provide high SNR with sufficient signal intensity, in some embodiments, the angle θ1 of the cavity 131 on the cover 130 of the optical assembly may be in a range of from about 40° to about 65°. Preferably, the angle θ1 of the cavity 131 on the cover 130 of the optical assembly may be in a range of from about 50° to about 60°.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of said numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It can be clearly understood by those skilled in the art that various changes may be made, and equivalent components may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and the like. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An optical assembly, comprising:
a light-emitting device and a photodetector;
a partition structure defining a first space for accommodating the light-emitting device and a second space for accommodating the photodetector; and
a cover disposed over the partition structure, the cover having a first surface facing the partition structure and a second surface opposite to the first surface;
wherein a first light emitted by the light-emitting device forms a first irradiance pattern projected on the second surface of the cover, the cover has a recess recessed from the first surface of the cover, and the recess has an interface configured to direct a second light emitted by the light-emitting device so that the second light is transmitted to an outside beyond the photodetector after the second light is reflected by the second surface of the cover.

2. The optical assembly of claim 1, wherein the interface is configured to direct the second light away from the photodetector in a direction away from the light-emitting device.

3. The optical assembly of claim 1, wherein the first light includes a plurality of light beams, and the interface is configured to bend the light beams away from the recess.

4. The optical assembly of claim 3, wherein the interface is configured to diverge the first light.

5. The optical assembly of claim 1, wherein the partition structure has an opening exposing the light-emitting device, and at least a side of the recess exceeds the opening as viewed in a vertical direction.

6. The optical assembly of claim 5, wherein at least a portion of the interface exceeds the opening as viewed in the vertical direction.

7. The optical assembly of claim 1, wherein an edge of the recess is connected to the first surface of the cover and vertically overlapping the light-emitting device.

8. The optical assembly of claim 1, wherein the recess is free from vertically overlapping the photodetector.

9. The optical assembly of claim 1, wherein the recess is entirely over the partition structure and partially vertically overlapping the light-emitting device.

10. The optical assembly of claim 9, wherein a depth of the recess is greater than half a thickness of the cover.

11. The optical assembly of claim 1, wherein the recess has a substantially trapezoidal cross-section, and the first surface of the cover is substantially parallel to the second surface of the cover.

12. The optical assembly of claim 11, wherein the interface extends at an incline from the first surface toward the second surface of the cover in a direction away from the photodetector.

13. The optical assembly of claim 11, wherein the interface is entirely between the first surface and the second surface of the cover.

14. The optical assembly of claim 1, wherein the recess has a substantially trapezoidal cross-section, and a width of the recess decreases in a direction toward the second surface of the cover.

15. The optical assembly of claim 1, wherein the interface of the recess is closer to the light-emitting device than to the photodetector.

16. The optical assembly of claim 1, wherein the first irradiance pattern includes a dark zone traversing the first irradiance pattern and a two-dimensional sub-pattern defining the dark zone, and the two-dimensional sub-pattern has a light intensity descending from a center portion toward outer portions.

17. The optical assembly of claim 1, wherein the partition structure has an opening exposing the photodetector, and the interface is configured to direct the second light to an outside of the opening.

18. The optical assembly of claim 17, wherein a width of the opening is less than a width of the photodetector.

19. The optical assembly of claim 1, wherein the recess of the cover is over the light-emitting device and recessed at a first portion of the first surface of the cover, and a second portion of the first surface of the cover spaced from the first portion is over the photodetector and flatter than the first portion.

* * * * *